United States Patent
Oteri et al.

(10) Patent No.: US 12,231,934 B2
(45) Date of Patent: Feb. 18, 2025

(54) METHODS AND DEVICES FOR SUB-CHANNELIZED TRANSMISSION SCHEMES IN WLANS

(71) Applicant: InterDigital Patent Holdings, Inc., Wilmington, DE (US)

(72) Inventors: Oghenekome Oteri, San Diego, CA (US); Hanqing Lou, Syosset, NY (US); Nirav B. Shah, San Diego, CA (US); Xiaofei Wang, Cedar Grove, NJ (US); Rui Yang, Greenlawn, NY (US); Guodong Zhang, Woodbury, NY (US); Frank La Sita, Setauket, NY (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/407,067

(22) Filed: Jan. 8, 2024

(65) Prior Publication Data

US 2024/0147274 A1 May 2, 2024

Related U.S. Application Data

(63) Continuation of application No. 17/235,599, filed on Apr. 20, 2021, now Pat. No. 11,910,210, which is a
(Continued)

(51) Int. Cl.
*H04W 24/08* (2009.01)
*H04J 11/00* (2006.01)
(Continued)

(52) U.S. Cl.
CPC ............ *H04W 24/08* (2013.01); *H04J 11/00* (2013.01); *H04W 52/34* (2013.01);
(Continued)

(58) Field of Classification Search
CPC ... H04W 24/08; H04W 52/34; H04W 74/006; H04W 74/0808
See application file for complete search history.

(56) References Cited

U.S. PATENT DOCUMENTS 6,985,465 B2   1/2006   Cervello et al.
8,428,016 B2   4/2013   Bhattad et al.
(Continued)

FOREIGN PATENT DOCUMENTS

CN   1893410     1/2007
CN   102316594   1/2012
(Continued)

OTHER PUBLICATIONS

US 8,818,384 B2, 08/2014, Ashraf et al. (withdrawn)
(Continued)

*Primary Examiner* — Jay L Vogel
(74) *Attorney, Agent, or Firm* — Volpe Koenig

(57) ABSTRACT

Device, systems, and/or techniques for using sub-channel signaling information between an access point and a first station are disclosed. In one aspect, a method performed by a station (STA) includes: receiving, from a neighboring STA in an overlapping basic service set (OBSS), a physical (PHY) layer preamble that includes a signal field indicating a plurality of sub-bands and associated power thresholds for Uplink Orthogonal Frequency-Divisional Multiple Access (UL OFDMA) transmission, that are available for OBSS spatial reuse (SR) by the STA; and sending, to an AP with which the STA is associated, an UL OFDMA transmission using a sub-band of the plurality of sub-bands and an associated power threshold indicated in the signal field. Additional embodiments are disclosed.

14 Claims, 25 Drawing Sheets

Related U.S. Application Data continuation of application No. 15/570,304, filed as application No. PCT/US2016/030030 on Apr. 29, 2016, now Pat. No. 10,986,517.

(60) Provisional application No. 62/154,621, filed on Apr. 29, 2015.

(51) Int. Cl.
*H04W 52/34* (2009.01)
*H04W 74/00* (2009.01)
*H04W 74/0808* (2024.01)
*H04W 84/12* (2009.01)

(52) U.S. Cl.
CPC ..... *H04W 74/006* (2013.01); *H04W 74/0808* (2013.01); *H04W 84/12* (2013.01)

(56) References Cited

U.S. PATENT DOCUMENTS

| | | | |
|---|---|---|---|
| 8,503,413 | B2 | 8/2013 | Uemura |
| 8,559,458 | B2 | 10/2013 | Maas et al. |
| 8,934,421 | B2 | 1/2015 | Chen et al. |
| 9,179,329 | B2 | 11/2015 | Li et al. |
| 9,451,636 | B2 | 9/2016 | Seok |
| 9,788,327 | B2 | 10/2017 | Song et al. |
| 10,182,361 | B1 | 1/2019 | Moon et al. |
| 10,536,910 | B2 | 1/2020 | Gaal et al. |
| 10,886,979 | B2 | 1/2021 | Forenza et al. |
| 10,986,517 | B2 | 4/2021 | Oteri et al. |
| 2003/0123405 | A1 | 7/2003 | Del Prado et al. |
| 2005/0143081 | A1 | 6/2005 | Stephens |
| 2008/0219381 | A1 | 9/2008 | Karaoguz et al. |
| 2009/0005058 | A1 | 1/2009 | Kazmi et al. |
| 2010/0197317 | A1* | 8/2010 | Sadek .......... H04W 72/541 455/452.2 |
| 2011/0116489 | A1 | 5/2011 | Grandhi |
| 2011/0170437 | A1 | 7/2011 | Zhou et al. |
| 2012/0327870 | A1 | 12/2012 | Grandhi et al. |
| 2013/0229996 | A1 | 9/2013 | Wang et al. |
| 2013/0286959 | A1 | 10/2013 | Lou et al. |
| 2014/0153497 | A1* | 6/2014 | Brisebois .......... H04W 72/23 370/329 |
| 2014/0254449 | A1 | 9/2014 | Wentink et al. |
| 2014/0286203 | A1 | 9/2014 | Jindal et al. |
| 2014/0328191 | A1 | 11/2014 | Barriac et al. |
| 2014/0328268 | A1* | 11/2014 | Zhu .......... H04W 74/002 370/329 |
| 2014/0328270 | A1 | 11/2014 | Zhu et al. |
| 2014/0362840 | A1 | 12/2014 | Wong et al. |
| 2014/0369276 | A1 | 12/2014 | Porat et al. |
| 2015/0071180 | A1 | 3/2015 | Cavalcante et al. |
| 2015/0071272 | A1 | 3/2015 | Vermani et al. |
| 2015/0181620 | A1 | 6/2015 | Seok |
| 2015/0264617 | A1 | 9/2015 | Choudhury et al. |
| 2015/0382360 | A1 | 12/2015 | Huang et al. |
| 2016/0021661 | A1 | 1/2016 | Yerramalli et al. |
| 2016/0066196 | A1 | 3/2016 | Jiang et al. |
| 2016/0127948 | A1 | 5/2016 | Azizi et al. |
| 2016/0227489 | A1 | 8/2016 | Oteri et al. |

FOREIGN PATENT DOCUMENTS

| | | |
|---|---|---|
| CN | 104159315 | 11/2014 |
| WO | 2006/107887 | 10/2006 |
| WO | 2014/110397 | 7/2014 |
| WO | 2014/209425 | 12/2014 |
| WO | 2015/038930 | 3/2015 |
| WO | 2015/112780 | 7/2015 |

OTHER PUBLICATIONS

Azizi et al., "OFDMA Numerology and Structure," IEEE 802.11-15/0331r1 (Mar. 9, 2015).

Chen et al., MAC and PHY Proposal for 802.11af, Technicolor, Document No. IEEE 802.11-10/0258r0, Mar. 2010, 23 pages.

Coffey et al., "Spatial Reuse AP Management", IEEE 802.11-15/0105r0, Jan. 2015, 9 pages.

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D0.1 (Mar. 2016).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).

Endo et al., "Station Clustering Strategy for DCF-based Centralized OFDMA WLAN Systems," 2013. International Conference on Connected Vehicles and Expo, pp. 343-349 (Dec. 2013).

Halasz, Dave, "Sub 1 GHz License-Exempt PAR and 5C", Aclara, Document No. IEEE 802.11-10/0001r13, Jul. 2010, 8 pages.

Hedayat et ai., "Channel Sensing in UL-OFDMA", Newracom, Document No. IEEE 802.11-15/378r1, Mar. 2015, 10 pages.

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE, "Draft Standard for Information Technology—Telecommunications and Information Exchange Between Systems—Local and Metropolitan Area Networks-Specifics", Part 11: Wireless Lan Medium Access Control (MAC) And Physical Layer (PHY) Specifications, Amendment 5: Enhancements for Very High Throughput for Operation in Bands Below 6 Ghz, IEEE P802.11ac™/D1.0, 802.11 Working Group of the 802 Committee, May 2011, 263 pages.

IEEE, "Draft Standard for Information Technology—Telecommunications and Information Exchange Between Systems Local and Metropolitan Area Networks—Specific Requirements", Part 11: Wireless LAN Medium Access Control (MAC) and Physical Layer (PHY) Specifications; Amendment 6: Sub 1 GHz License Exempt Operation, IEEE P802.11ah™/D3.0, Prepared by the 802.11 Working Group of the LAN/MAN Standards Committee of the IEEE Computer Society, Oct. 2014, 611 pages.

IEEE, "IEEE Standard for Information Technology—Telecommunications and Information Exchange Between Systems, Local and Metropolitan Area Networks—Specific Requirements", Part 11: Wireless LAN Medium Access Control (MAC) and Physical Layer (PHY) Specifications, IEEE Computer Society, IEEE Std 802.11™ (Revision of IEEE Std 802.Nov. 2007), Mar. 29, 2012, 2793 pages.

IEEE, "IEEE Standard for Information Technology—Telecommunications and Information Exchange Between Systems, Local and Metropolitan Area Networks—Specific Requirements", Part 11: Wireless LAN Medium Access Control (MAC) and Physical Layer (PHY) Specifications, Amendment 3: Enhancements for Very High Throughput in the 60 GHz Band, IEEE Computer Society, IEEE Std 802.11ad™, Dec. 28, 2012,628 pages.

IEEE, "IEEE Standard for Information Technology—Telecommunications and Information Exchange Between Systems, Local and Metropolitan Area Networks—Specific Requirements", Part 11: Wireless LAN Medium Access Control (MAC) and Physical Layer (PHY) Specifications, Amendment 2: Fast Basic Service Set (BSS) Transition, IEEE Computer Society, IEEE Std 802.11r™, Jul. 15, 2008, 126 pages.

(56) References Cited

OTHER PUBLICATIONS

Intel Corporation, "Discussion on UE power consumption reduction," 3GPP TSG RAN WG1 Meeting #78bis, R1-143770, Ljubljana, Slovenia (Oct. 6-10, 2014).
Magd-Aboul, Osama, "802.11 HEW SG Proposed PAR", Huawei Technologies, Document No. IEEE 802.11-14/0165r1, Mar. 2014, 6 pages.
Magd-Aboul, Osama, "IEEE 802.11 HEW SG Proposed CSD", Document No. IEEE 802.11-14/0169r1, Mar. 2014, 6 pages.
Perahia et al., "HEW Usage Scenarios and Applications", Intel, Document No. IEEE 802.11-13/0514r0, May 2012, 23 pages.
Zhao et al., "Scalable Channel Utilization Scheme", KDDI R&D Labs, Document No. IEEE 01-15/0035r1, Jan. 2015, 8 pages.
Zhao, "Physical Layer Interference Mitigation Technology in 60GHz Wireless Networks," Master's Thesis (Nov. 30, 2012).

\* cited by examiner

METHODS AND DEVICES FOR SUB-CHANNELIZED TRANSMISSION SCHEMES IN WLANS

CROSS-REFERENCE TO RELATED APPLICATIONS

This application is a continuation of U.S. patent application Ser. No. 17/235,599 filed on Apr. 20, 2021, which is a continuation of U.S. patent application Ser. No. 15/570,304 filed on Oct. 27, 2017, which issued as U.S. Pat. No. 10,986,517 on Apr. 20, 2021, which is the National Stage Entry under 35 U.S.C. § 371 Patent Cooperation Treaty Application No. PCT/US2016/030030, filed Apr. 29, 2016, which claims the benefit of U.S. Provisional Patent Application No. 62/154,621, filed Apr. 29, 2015, the entire contents of which is hereby incorporated by reference as if fully set-forth herein, for all purposes.

BACKGROUND

A WLAN in Infrastructure Basic Service Set (BSS) mode may have an Access Point (AP) for a BSS and/or one or more stations (STAs) associated with the AP. The AP may have an access and/or interface to a Distribution System (DS) and/or another type of wired/wireless network that may carry traffic in and/or out of the BSS. Traffic to STAs that originates from outside the BSS may arrive through the AP and/or may be delivered to the STAs. Traffic originating from STAs to destinations outside the BSS may be sent to the AP and/or may be delivered to the respective destinations. Traffic between STAs within the BSS may be sent through the AP where the source STA may send the traffic to the AP. The AP may deliver the traffic to the destination STA. Traffic between STAs within a BSS may be peer-to-peer traffic. Peer-to-peer traffic may be sent directly between the source and destination STAs with a direct link setup (DLS) using an 802.11e DLS and/or an 802.11z tunneled DLS (TDLS). A WLAN using an Independent BSS (IBSS) mode might not have an AP, and/or an STA may communicate directly with other STAs. This mode of communication may be referred to as an "ad-hoc" mode of communication.

SUMMARY

Techniques for using sub-channel signaling information between at least one access point and a first station may comprise receiving an uplink trigger sent from the at least one access point to the first station. Techniques may comprise transmitting from the first station a map indicating at least one sub-channel that is available for spatial sharing by a second station. Techniques may comprise receiving, at the first station, an acknowledgement from the at least one access point that data was transmitted from a second station on the at least one sub-channel and/or received by the at least one access point.

Techniques may comprise determining whether an OFDMA transmission having a sub-channel is available for transmitting data. Techniques may comprise identifying, at a first station, the OFDMA transmission from a second station. Techniques may comprise measuring an energy in the sub-channel for the OFDMA transmission. Techniques may comprise comparing the measured energy to a threshold. Techniques may include determining that a sub-channel is free, perhaps for example if the measured energy is not greater than the threshold. Techniques may include determining that the sub-channel is busy, perhaps for example if the measured energy is greater than the threshold. The threshold may be determined dynamically or may be static.

Techniques may be performed by an access point (AP) device in a first Basic Service Set (BSS). The AP may be in communication with one or more stations (STAs) in the first BSS. Techniques may include determining one or more sub-bands that have a potential for Overlapping BSS (OBSS) spatial reuse (OBSS SR) for uplink (UL) communication by one or more STAs in a second BSS. Techniques may include determining specific information for OBSS SR for each of the one or more sub-bands. The specific information may include one or more thresholds related to each of the one or more sub-bands' potential for OBSS SR for the UL communication. Techniques may include sending, via a transmitter, the specific information to the one or more STAs in the first BSS.

Techniques may be performed by station (STA) in a first Basic Service Set (BSS). The STA may be capable of detecting communication from an access point (AP) device in a second BSS. Techniques may include detecting, via a receiver, information from the AP regarding one or more sub-bands that have a potential for Overlapping BSS (OBSS) spatial reuse (OBSS SR) for uplink (UL) communication by the STA. Techniques may include determining at least one of the one or more sub-bands is suitable for OBSS SR for UL communication. Techniques may include modifying a Carrier Sense Multiple Access with Collision Avoidance (CSMA/CA) mechanism to assign an increased priority for transmission to the at least one of the one or more sub-bands, or assign an increased priority for transmission to a transmission channel including the at least one of the one or more sub-bands and limit a transmission to the at least one of the one or more sub-bands. Techniques may include sending, via a transmitter, an OBSS SR UL transmission using the at least one of the one or more sub-bands.

Techniques may be performed by a first station (first STA) in a first Basic Service Set (BSS). The first STA may be an UL OFMDA STA. Techniques may include receiving, via a receiver from an access point (AP) device in the first BSS, specific information for one or more sub-bands' potential for OBSS spatial reuse (OBSS SR) for uplink (UL) communication for one or more STAs in a second BSS. The specific information may include one or more thresholds related to each of the one or more sub-bands' potential for OBSS SR for the UL communication. Techniques may include sending, via a transmitter, a transmission that may include at least some of the specific information to at least one of: the AP, or one or more other stations (STAs) in the first BSS. The transmission may be detectable by at least one STA of the one or more STAs in the second BSS. The at least one STA of the one or more STAs in the second BSS may be an OBSS STA.

DETAILED DESCRIPTION

Figure 1:
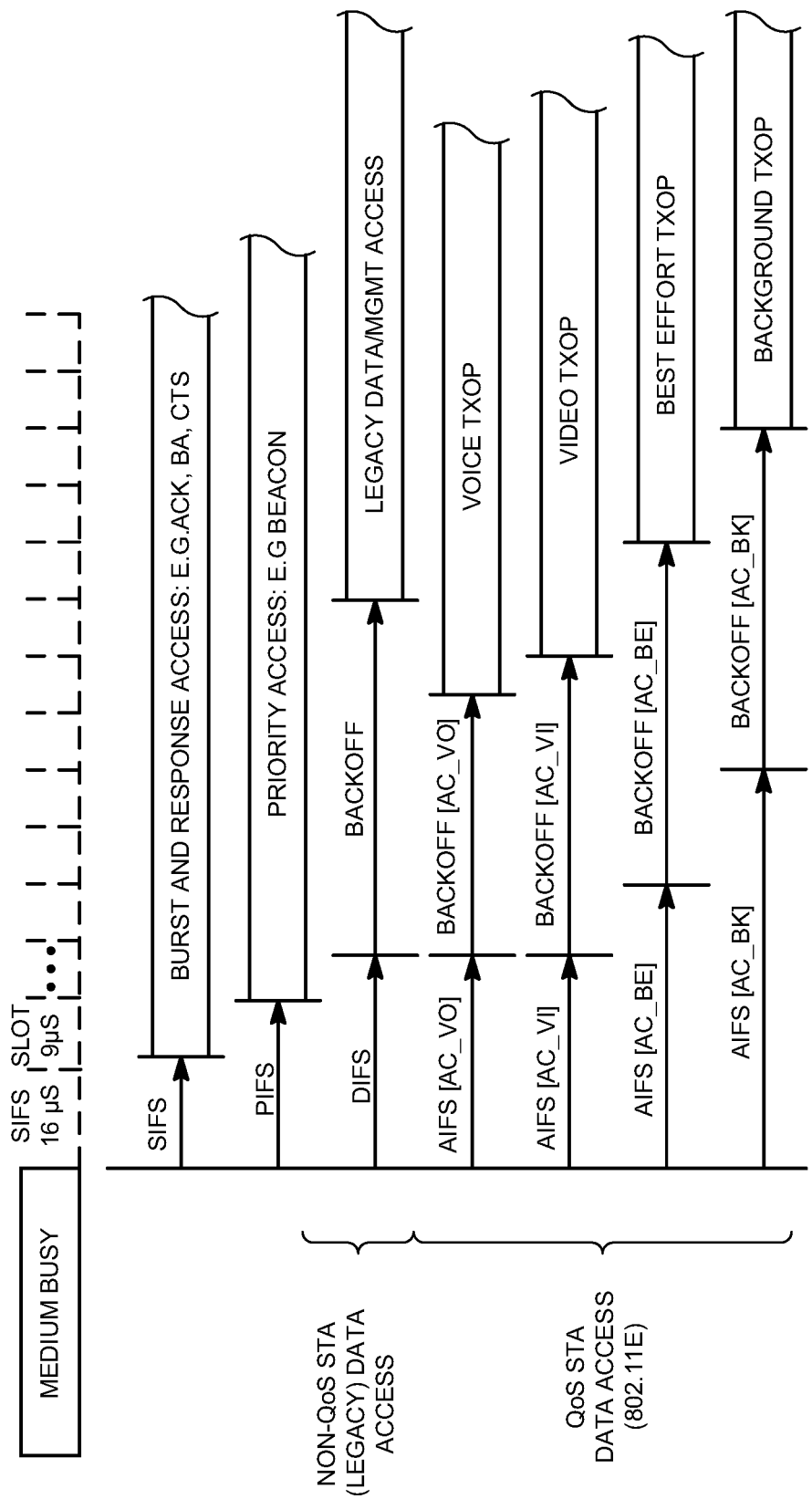
FIG. 1 is an illustration of EDCA operation.

A detailed description of illustrative embodiments will now be described with reference to the various Figures. Although this description provides a detailed example of possible implementations, it should be noted that the details are intended to be examples and in no way limit the scope of the application.

Using an 802.11ac infrastructure mode of operation, the AP may transmit a beacon on a fixed channel, which may be the primary channel. This channel may be 20 MHz wide and/or may be the operating channel of the BSS. This channel may be used by the STAs to establish a connection with the AP. The fundamental channel access mechanism in an 802.11 system may be Carrier Sense Multiple Access with Collision Avoidance (CSMA/CA). In this mode of operation, the STAs, including the AP, may sense the primary channel. If the channel is detected to be busy, the STA may back off. Transmission may be limited to a single STA at a given time in a given BSS.

In 802.11n, High Throughput (HT) STAs may use a 40 MHz wide channel for communication. This may be achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and/or 160 MHz wide channels. The 40 MHz and/or 80 MHz channels are formed by combining contiguous 20 MHz channels similar to 802.11n described above. A 160 MHz channel may be formed by combining 8 contiguous 20 MHz channels, and/or by combining two non-contiguous 80 MHz channels. This may be referred to as an 80+80 configuration. For the 80+80 configuration, the data, after channel encoding, may be passed through a segment parser that divides it into two streams. Inverse Fast Fourier Transform ("IFFT") and/or time domain processing may be done on one or more, or each, stream separately. The streams may be mapped on to the two channels, and/or the data may be transmitted. At the receiver, this mechanism may be reversed, and/or the combined data may be sent to the MAC.

Sub 1 GHz modes of operation are supported by 802.11af and/or 802.11ah. For these specifications the channel operating bandwidths, and/or carriers, may be reduced relative to those used in 802.11n, and/or 802.11ac. 802.11af supports 5 MHz, 10 MHz and/or 20 MHz bandwidths in the TV White Space (TVWS) spectrum, and/or 802.11ah supports 1 MHz, 2 MHz, 4 MHz, 8 MHz, and/or 16 MHz bandwidths using non-TVWS spectrum. A possible use case for 802.11ah is support for Meter Type Control/Machine-Type Communications (MTC devices in a macro coverage area). MTC devices may have limited capabilities including support for limited bandwidths and/or a requirement for a very long battery life.

WLAN systems, which support one or more, or multiple channels and/or channel bandwidths, such as 802.11n, 802.11ac, 802.11af, and/or 802.11ah, may include a channel which is designated as the primary channel. The primary channel may, but not necessarily, have a bandwidth equal to the largest common operating bandwidth supported by one or more, or all STAs in the BSS. The bandwidth of the primary channel may be limited by the STA, of one or more, or all STAs in operating in a BSS, which supports the smallest bandwidth operating mode. In the example of 802.11ah, the primary channel may be 1 MHz wide if there are STAs (e.g., MTC type devices) that support a 1 MHz mode even if the AP, and/or other STAs in the BSS, may support a 2 MHz, 4 MHz, 8 MHz, 16 MHz, or other channel bandwidth operating modes. Carrier sensing, and/or NAV settings, may depend on the status of the primary channel. If the primary channel is busy, for example, due to a STA supporting only a 1 MHz operating mode is transmitting to the AP, then the entire available frequency bands may be considered busy even though a majority of them stay idle and/or are available.

In the United States, the available frequency bands which may be used by 802.11ah are from 902 MHz to 928 MHz. In Korea the available frequency bands are from 917.5 MHz to 923.5 MHz; and in Japan, the available frequency bands are from 916.5 MHz to 927.5 MHz. The total bandwidth available for 802.11ah is 6 MHz to 26 MHz depending on the country code.

Enhanced distributed channel access (EDCA) is an extension of the basic DCF (Distributed Coordination Function) introduced in the 802.11 to support prioritized QoS. EDCA supports contention based access of the medium. The operation of EDCA in 802.11n is shown in FIG. 1. The Point Coordination Function (PCF) may use contention free channel access to support time-bounded services with polling by the AP to one or more, or each, STA in the BSS. The AP sends a polling message after waiting for PCF Interface Space ("PIFS") and if client has nothing to transmit, it may return a null data frame. It is deterministic, fair, and/or efficient for low duty-cycle and/or heavy/bursty traffic. Hybrid Coordination Function (HCF) Controlled Channel Access (HCCA) may be an enhancement of PCF, in which the AP may poll a STA during a contention period (CP) and/or a contention-free period (CFP). It may transmit one or more, or multiple frames under one poll.

Potential applications for High Efficiency WLAN (HEW) include emerging usage scenarios such as data delivery for stadium events, high user density scenarios such as train stations, and/or enterprise/retail environments, and/or scenarios with an increased dependence on video delivery and/or wireless services for medical applications.

Transmission procedures in current 802.11 implementations (802.11a/g/n/ac/ah) may assume the use of the entire allocated bandwidth for transmission and/or reception. OFDMA is a method which has been used in LTE and/or WiMax to address inefficiencies caused by resource scheduling that allocates the entire channel to a single user as is in 802.11ac. A direct application of OFDMA to WiFi may introduce backward compatibility issues. Coordinated Orthogonal Block-based Resource Allocation, (COBRA) introduced OFDMA methods to, inter alia, resolve WiFi backward compatibility issues and/or implicit inefficiencies that may be caused by, inter alia, channel based resource scheduling. For example, COBRA may enable the transmissions over one or more, or multiple smaller frequency-time resource units. One or more, or multiple users may be allocated to non-overlapping frequency-time resource unit(s) and/or may be enabled to transmit and/or receive (for example, simultaneously). A sub-channel may be defined as a basic frequency resource unit that an AP may allocate to a STA. For example, keeping the requirement of backward compatibility with 802.11n/ac in mind, a sub-channel may be defined as a 20 MHz channel. These sub-channels may have bandwidths less than 20 MHz and/or they may be limited to bandwidths of 20 MHz.

Technologies in COBRA may include multicarrier modulation, filtering, time, frequency, space, and/or polarization domains as the basis for the transmission and coding scheme. A COBRA scheme may be implemented using one or more of the following: OFDMA Subchannelization, SC-FDMA Subchannelization, and/or Filter-Bank Multicarrier Subchannelization. One or more of the following features may be used with COBRA transmission: methods for coverage range extension, methods of grouping users, methods for channel access, preamble designs for low overhead, methods for beamforming and/or sounding, methods for frequency and/or timing synchronization, and/or methods for link adaptation.

Multi-user and/or single user multiple parallel (MU-PCA) channel access schemes are discussed. COBRA and/or Multi-user/Single-User parallel channel access using transmit/receive with symmetrical bandwidth, may include one or more of: down-link parallel channel access for multiple/single users, up-link parallel channel access for multiple/single users, combined down-link and up-link parallel channel access for multiple/single users, design to support unequal MCS and/or unequal transmit power for SU-PCA and/or COBRA, PHY designs and/or procedures to support multi-user/single-user parallel channel access using transmit/receive with symmetrical bandwidth, and/or mixed MAC/PHY multi-user parallel channel access. MU-PCA discusses COBRA and/or multi-user/single-user parallel channel access transmit/receive with asymmetrical bandwidth, which may include MAC designs and/or procedures for downlink, uplink and/or combined uplink and downlink for multi-user/single-user parallel channel access using transmit/receive with asymmetrical bandwidth and/or PHY designs and/or procedures to support multi-user/single-user parallel channel access using transmit/receive with asymmetrical bandwidth.

Techniques such as scalable channel utilization in which STAs may scale their transmission bandwidths based on channel and/or traffic availability.

The use of OFDMA in 802.11 may allow for techniques such as scalable channel utilization and/or improved spatial reuse. The techniques may have to be adapted to enable them to work in 802.11 due to problems that are specific to the 802.11 standard (e.g., specific to how the 802.11 standard works).

Figure 2:
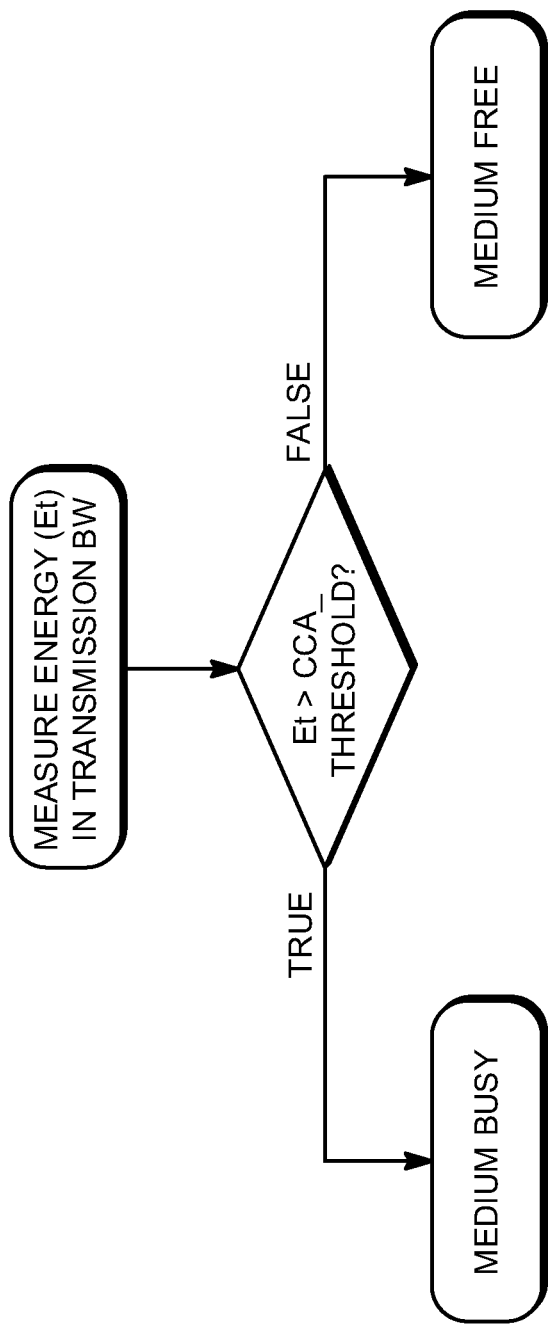
FIG. 2 is an illustration of an energy detect clear channel method and/or system.

The Clear Channel Assessment (CCA) threshold may be used by STAs to decide whether a channel is available for use or not. The STA may measure the energy in the channel and/or decides if it is available for transmission based on whether the energy in the channel exceeds a CCA threshold. The threshold may be fixed and/or dynamic. An energy detect clear channel procedure is illustrated FIG. 2.

Information about channel availability to enable scalable channel utilization and/or increased spatial reuse for Overlapping Basic Service Set (OBSS) STAs may be useful. Scalable channel utilization may allow STAs to dynamically select/deselect (sub-) channels within the transmission bandwidth, perhaps for example based on the quality of the channel (e.g., whether the channel is busy or not). Scalable channel utilization may be a possible technique for OFDMA based 802.11 systems (e.g., 802.11ax). To enable scalable channel utilization, STA/AP may to identify sub-channels that are in use and/or utilize the information to scale its channel bandwidth appropriately.

For transmissions within the same BSS, the multi-user frame exchange between STAs/AP may enable the selection of available sub-channels. For OBSS STAs, information and/or techniques may be useful to enable scalable channel utilization and/or improve spatial reuse. Techniques that improve spatial reuse OFDMA transmissions in OBSSs may be useful.

An STA may wake up in the middle an OFDMA transmission and/or may incorrectly decide the channel is busy or clear. In a scenario where an STA wakes up in the middle of a transmission between an AP and other STA(s), the STA may to perform a clear channel assessment (CCA) before transmission. As the STA might not have heard the OFDMA setup frames (e.g., in the case of OFDMA transmission) and/or RTS/CTS setup frames (e.g., in the case of non-OFDMA transmission), it might not be able to set the NAV for the transmission duration and/or may perform energy-detect clear channel assessment (CCA).

Figure 3:
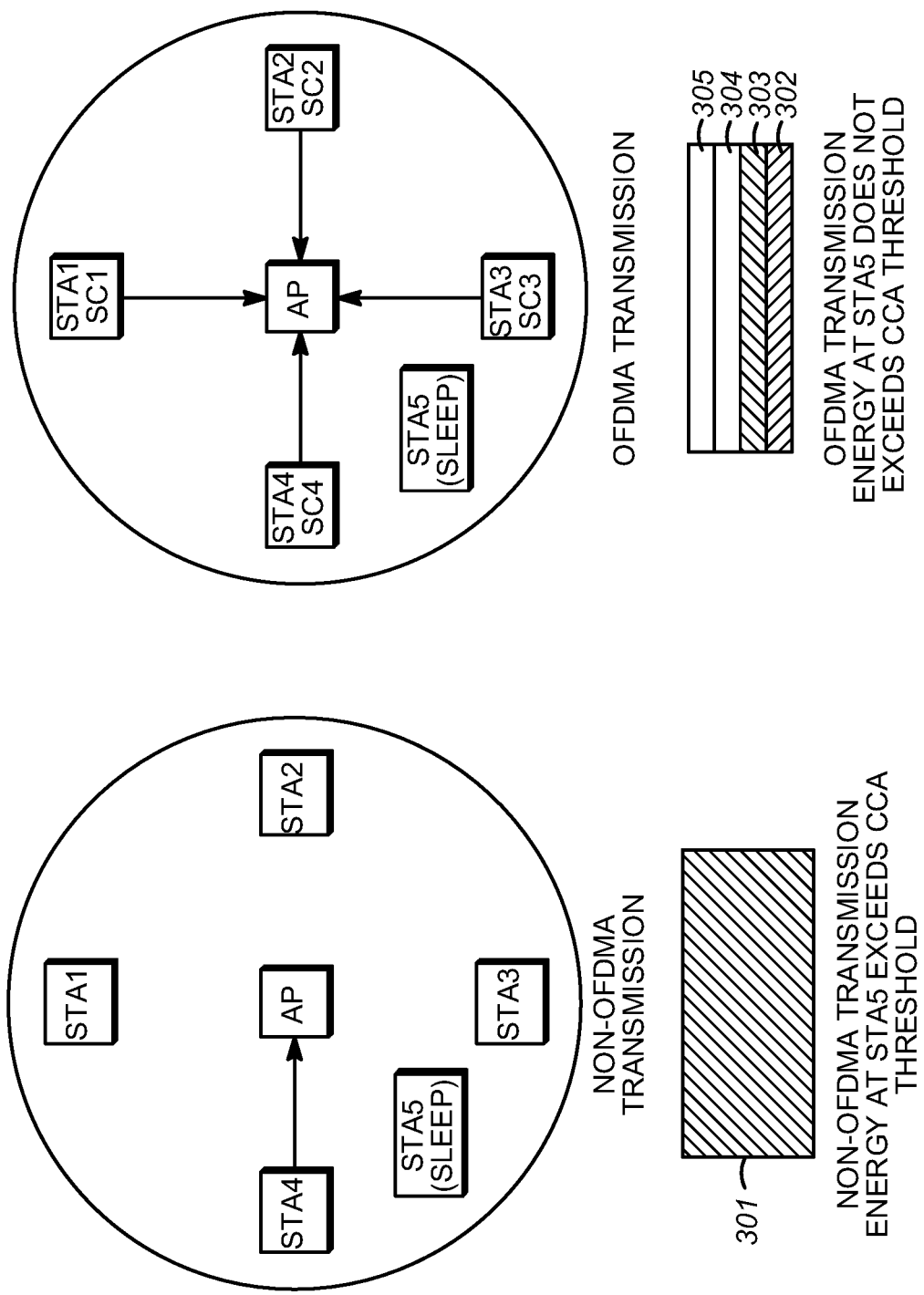
FIG. 3 is an illustration of CCA in UL-OFDMA.

For non-OFDMA transmission that is not in a hidden node scenario, the STA may measure the energy in the transmission medium and/or evaluate whether the medium is busy or not. For OFDMA transmissions even in the case of a non-hidden node scenario, the energy in the over-heard sub-channel may be less than the CCA threshold and, perhaps as such, the STA may assume that the channel is empty. This may occur where the OFDMA transmissions keep the same power spectral density during transmissions as the non-OFDMA transmissions. This may increase the probability of collisions during an uplink OFDMA transmission. This is illustrated in FIG. 3, which shows CCA in UL-OFDMA. FIG. 3 shows Non-OFDMA transmission energy at STA5 exceeding a threshold with the box 301 being filled in and OFDMA transmission energy at STA5 not exceeding the CCA threshold with the energy level filling boxes 302 and 303, but not boxes 304, 305. A non-OFDMA transmission may be an OBSS transmission, among other non-OFDMA transmissions. As shown in FIG. 3, a CCA threshold may be higher for a non-OFDMA transmission as compared to an OFDMA transmission. In some scenarios, the CCA thresholds may be used, for example by an AP, to make OBSS spatial reuse more likely (e.g., more easily obtainable) in one or more sub-channels and/or less likely (e.g., more difficult to obtain) in one or more other sub-channels. Techniques may be useful to ensure that a STA is able to perform a clear channel assessment in the presence of an OFDMA transmission.

Figure 20:
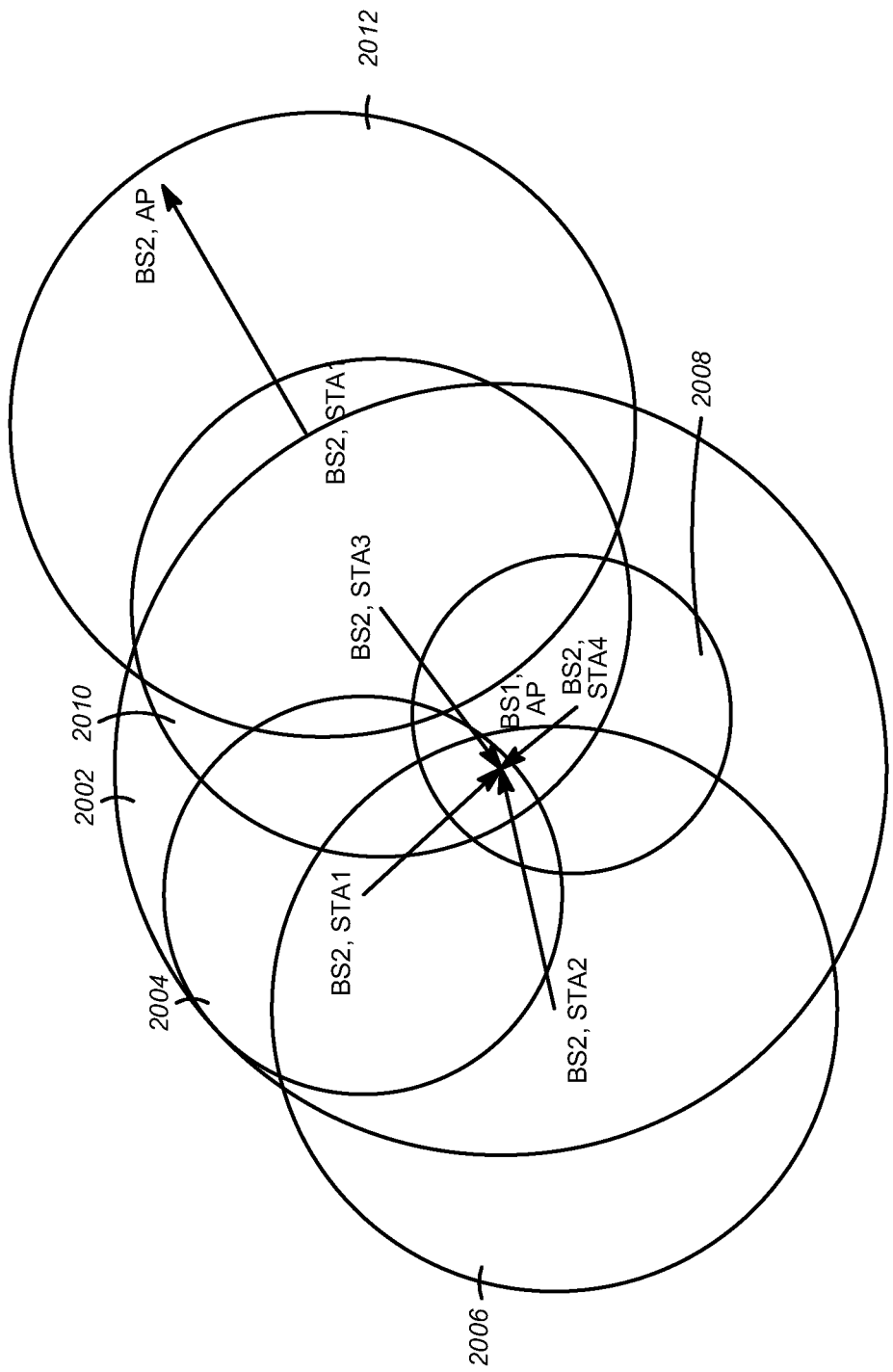
FIG. 20 is an example OBSS Network with OFDMA transmission.

As used for example in FIG. 3, FIG. 5, FIG. 8, FIG. 9, FIG. 11A, FIG. 11B, FIG. 15, and/or FIG. 20 and/or one or more other figures and throughout the description, STA labels, AP labels, BS labels, SC labels, address labels, field labels, BSS labels, CH/channel labels, sub-channel/sub-band labels, resource unit labels, and/or the like, numbered and/or otherwise, are stand-alone labels used for the purpose of explanation and/or example, and not meant to convey anything limiting and/or cumulative. For example, STA1, STA2, CH1, and/or BS1 on a particular figure may be understood to be a first station, a second station, a first channel, and/or a first base station for purposes of illustration and/or example of the particular concept(s) being described.

Figure 4:
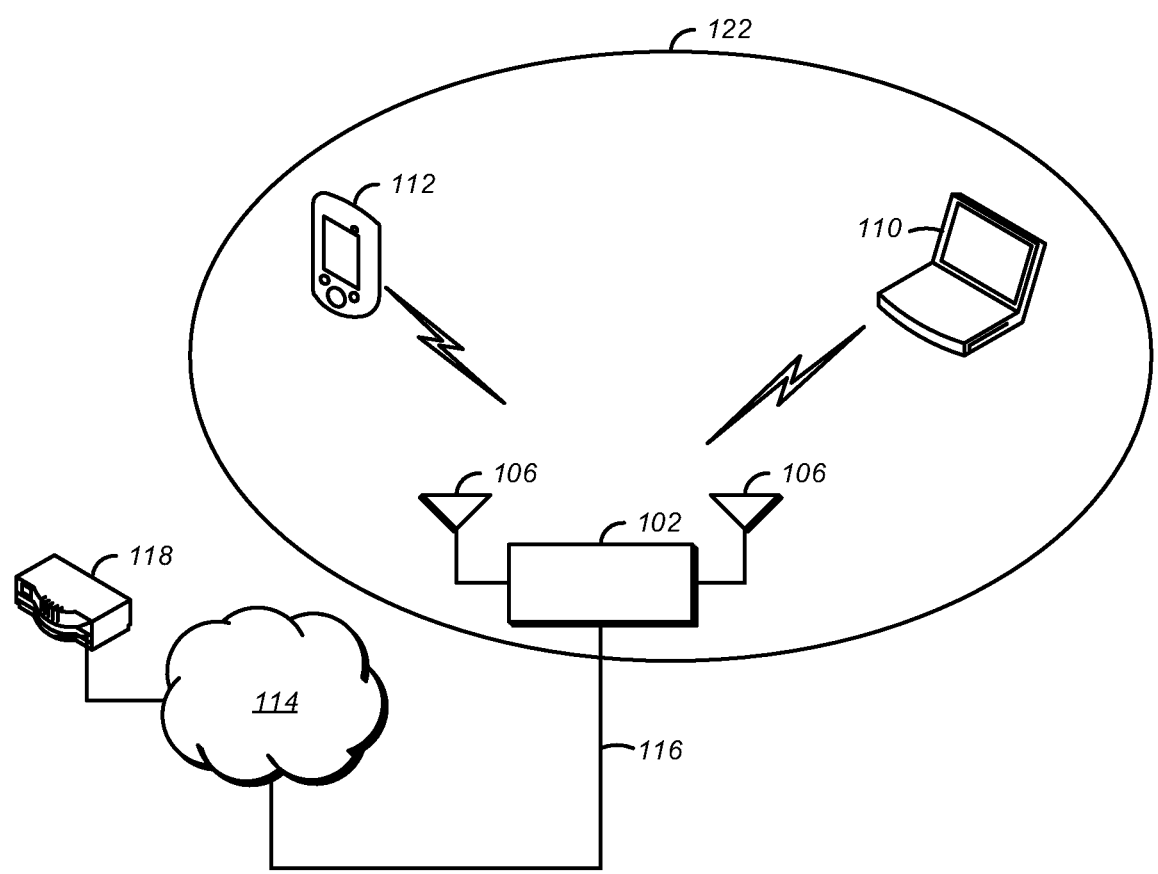
FIG. 4 is an example of Wireless Local Area Network (WLAN) devices.

FIG. 4 illustrates example wireless local area network (WLAN) devices. One or more of the devices may be used to implement one or more of the features described herein. The WLAN may include, but is not limited to, access point (AP) 102, station (STA) 110, and/or STA 112. STA 110 and 112 may be associated with AP 102. The WLAN may be configured to implement one or more protocols of, inter alia, the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and/or STA(s) associated with the AP may comprise a basic service set (BSS). For example, AP 102, STA 110, and/or STA 112 may comprise BSS 122. An extended service set (ESS) may comprise one or more APs (with one or more BSSs) and/or STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and/or, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

Devices such as IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN and/or portion thereof may be configured so that one STA may transmit at a given time, e.g., in a given BSS. Channel access may include RTS and/or CTS signaling. For example, an exchange of a request to send (RTS) frame may be transmitted by a sending device and/or a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN and/or subset thereof (e.g., a BSS). Other STAs may count down the NAV to zero. When the counter reaches a value of zero, the NAV functionality may indicate to the other STA that the channel is now available.

The devices in a WLAN, such as an AP and/or STA, may include one or more of the following: a processor, a memory, a radio receiver and/or transmitter (e.g., which may be combined in a transceiver), one or more antennas (e.g., antennas 106 in FIG. 3), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and/or the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 3. The processor may be configured to execute processor executable code (e.g., instructions) including, for example, software and/or firmware instructions. For example, the processor may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code and/or instructions (e.g., software, firmware, etc.), electronic data, databases, and/or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processor. The processor may communicate with one or more entities of memory, e.g., via a system bus, directly, etc.

Figure 5:
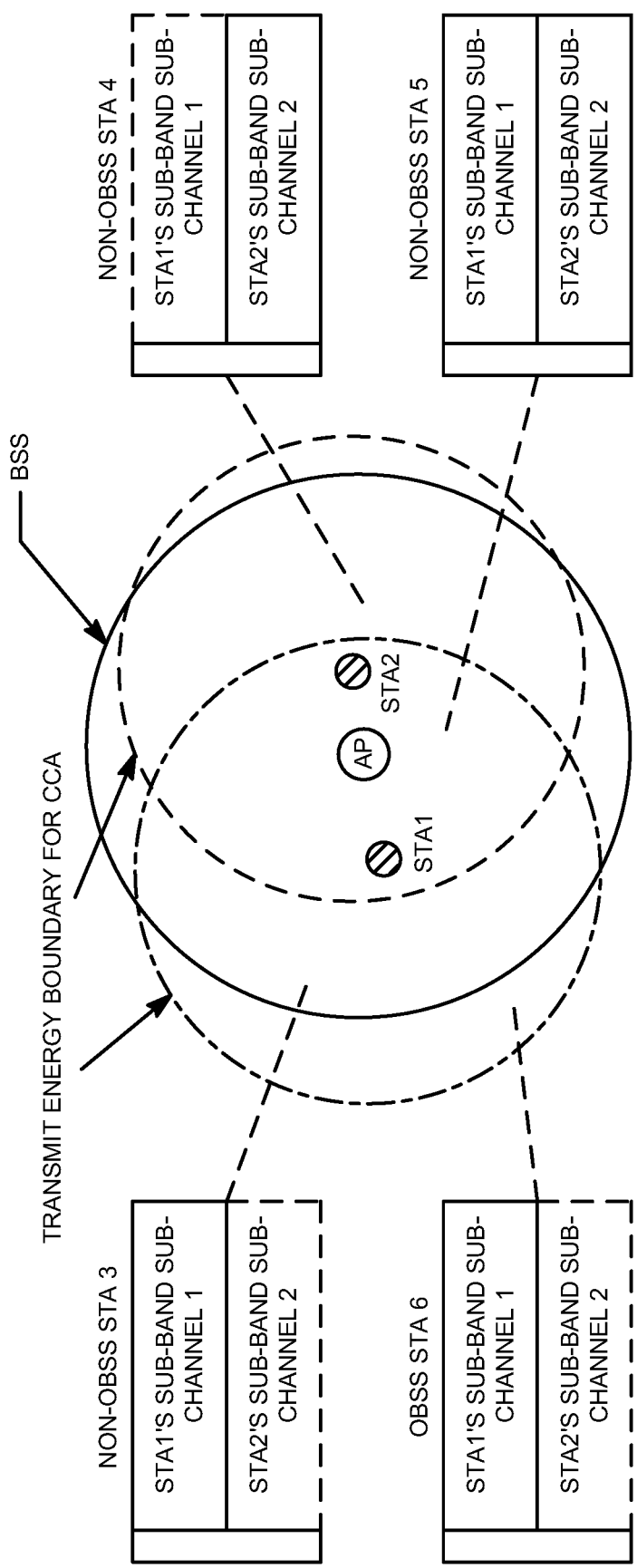
FIG. 5 is an illustration of partially hidden nodes.

Several channel measurements and/or corresponding request and/or response mechanisms may be defined. With OFDMA transmissions, the system performance may be optimized by acquiring more information about sub-channel operations. The sub-channel measurements and/or corresponding request/response mechanisms and/or procedures might not be defined. In FIG. 5, an UL-OFDMA transmission occurs from STA1 and STA2 to the AP. Using previous CCA procedures, non-OBSS STA5 may estimate the channel is unavailable. For STA 4, 5, and 6, the previous CCA may fail based on their measuring energy averaged across the entire transmission bandwidth. For non-OBSS STAs 3 and 4, averaging across the entire bandwidth may result in an energy level that is less than the CCA threshold and/or result in collisions during an OFDMA session. For OBSS STAG, depending on the energy in the sub-channel, averaging across the entire bandwidth may result in an energy level that is greater than the CCA threshold and/or result in prevention of spatial reuse transmission. Techniques to enable proper Clear Channel Assessment in OFDMA scenarios may be useful to prevent these issues.

Methods, systems, and/or devices described herein may use explicit signaling information for improved spatial reuse in OBSS and/or hidden node reduction in intra-BSS OFDMA transmission. This may address the need for information about channel availability to enable scaleable channel utilization and/or increased spatial reuse for OBSS STAs and/or partially hidden nodes. For the systems, devices, and/or methods, information on the sub-channels used by different STAs may be explicitly signaled. This may enable OBSS STAs to identify sub-channels that they may use, e.g., simultaneously. The OFDMA transmission may take place in a primary BSS, and/or there may be a neighboring and/or overlapping BSS in which the OBSS transmission takes place.

An AP may decide which bands may be used in a spatial reuse mode. The AP/STA reception may be robust to interference. The AP may send out control information, indicating that the sub-channel the AP is allocated to, may be used by OBSS STAs for spatial reuse. Examples of such "robust to interference" STAs may include one or more of the following: an STA located far away from any possible OBSS transmission (e.g., near the center of the BSS as opposed to near the edge of the BSS) and/or an STA that has the capability to cancel out-of-BSS interference (e.g., STAs using an advanced interference suppression receiver). The AP may send information for spatial reuse for respective sub-channels/sub-bands, such as for example specific information on a sub-channel/sub-band basis. The information for spatial reuse may correspond to the potential of a specific sub-band(s) for spatial reuse, for example for OBSS spatial reuse. The information for OBSS spatial reuse for the respective sub-channels/sub-bands may be similar and/or different for one or more, or each, respective sub-channel/sub-band. For example, the AP may indicate similar and/or different levels/thresholds of interference that may be acceptable for OBSS spatial reuse for one or more sub-channels/sub-bands. In some scenarios, the interference thresholds/levels may be used, for example by an AP, to make OBSS spatial reuse more likely (e.g., more easily obtainable) in one or more sub-channels and/or less likely (e.g., more difficult to obtain) in one or more other sub-channels. For example, acceptable interference thresholds/levels may be lower (e.g., less interference may be acceptable) for OBSS spatial reuse in one or more sub-channels. For example, acceptable interference thresholds/levels may be higher (e.g., higher interference may be acceptable) for OBSS spatial reuse in one or more other sub-channels.

Robustness to interference may vary due to channel conditions and/or varying interference from other STAs. The robustness may be estimated as "long term," in which the variation is averaged out and/or the long term behavior is tracked, or as "short term", which evaluates the robustness (for example, instantaneously or the like). The knowledge may be gleaned by the AP from, inter alia, information like the number of retransmissions, the number of collisions estimated during transmission to an STA, and/or a STAs geographical positioning with respect to overlapping BSSs (e.g., BSS edge vs. BSS center STAs). The information may be fed to the AP explicitly by one or more, or each, STA. These implementations may be used for unicast transmissions, and/or might not be used for broadcast and/or multicast ones.

In downlink transmission, STAs that are robust to interference may send out (and/or have sent out by another node) information to OBSS to indicate that they may be robust to spatial reuse transmission by an OBSS STA.

In uplink transmission, STAs that are robust to interference and/or offer low interference to other OBSSs may also send out (and/or have sent out by another node) information to OBSS to indicate that they may be robust to spatial reuse transmission by an OBSS STA thereby facilitating spatial reuse transmission. An STA located far away from any possible OBSS transmission (e.g., near the center of the BSS as opposed to near the edge of the BSS) may offer little interference to other OBSS transmission. This may be helped in scenarios where the STA performs transmit power control. STAs transmitting with low MCS may have their reception robust to OBSS interference.

The information communicated to the neighboring BSSs may include one or more of the following: information indicating the specific sub-channels that may be used by OBSS STAs and/or additional information on the STAs allocated to one or more, or each, sub-channel(s). Information indicating the specific sub-channels that may be used by OBSS STAs may include one or more of the following. Information may be in the form of a bit-map with one or more, or each, bit indicating if a sub-channel is in use by a STA/AP that is robust to interference. Information may be in the form of a bit-map with one or more, or each, bit indicating if a sub-channel is not scheduled during this OFDMA transmission (e.g., an empty sub-channel) or not. Information may be mapping to sub-channel availability probabilities. The availability of the sub-channels currently being used by the STA could be based upon the STA's assessment of its reception robustness over those sub-channels. The STA may perform measurements across one or more, or each, sub-channels, and/or not necessarily the one the STA is using. The STA may report to OBSS nodes (e.g., only to OBSS nodes) about the last sub-channel it used, e.g., via its last transmission on that sub-channel and/or the last transmission may be a data frame and/or an acknowledgement frame.

For example, assuming a sub-channel width of 2.5 MHz and/or transmission bandwidth of 20 MHz, an 8-bit bit-map may be used to indicate that an OBSS STA may transmit on that sub-channel. In another example, in the resource allocation may be based on a fixed number of resource units. The following numerology in a transmission bandwidth of 20 MHz: Resource Unit (RU) of 26-tone with 2 pilots, RU of 52-tone with 4 pilots, RU of 102 data tone plus 4 to 6 pilots, and/or RU of 242-tone with 8 pilots. In this case, an 11-bit bit-map may be used to indicate the RU numerology used and/or the RUs that may be transmitted on by an OBSS STA. The first two bits may indicate the RU group used (1, 2, 3 and/or 4) while the next 9-bits may be used to indicate the status of one or more, or each, of the RUs. For example, 1,0,1,0 may indicate resource group 3, with the first RU available and/or the second RU not available. The OBSS STA may use information from one or more, or multiple neighboring BSSs. The PBSS STA may decide on whether to transmit in a given resource.

Additional information on the specific STAs allocated to one or more, or each, sub-channels may include one or more of the following. If a channel is shown as available, the Partial AID of the STA that it utilizing that channel is also transmitted and/or the transmission power used to communicate the information may be used by an OBSS STA to determine the proximity of the transmitting STA to the OBSS STA.

With information regarding the specific sub-channels that may be used by OBSS STAs, OBSS STAs may be able to improve spatial reuse. The OBSS STAs may use sub-channels that are indicated as "free" and/or available. With information regarding the specific sub-channels that may be used by any OBSS STAs and/or the specific STAs allocated to one or more, or each, sub-channels, OBSS STAs may be able to improve the spatial reuse further using both the identity of the STAs and/or the available sub-channels to decide on spatial reuse. For example, a BSS may identify a sub-channel as free. An OBSS STA may be able to overhear transmissions from a specific STA. An OBSS STA may be able to identify that sub-channel as not free for that specific OBSS STA. Information (e.g., one or more of the following) described in his paragraph may be transmitted by the AP during the schedule frame for the multi-user transmission.

The STAs scheduled within the BSS may re-transmit the information e.g., to ensure that OBSS STAs may overhear this information. This re-transmission may be piggy-backed on their response frames to the AP. The retransmitted information may be one or more of the following: information pertaining to the specific STA (e.g., the specific STA only), e.g., the specific sub-channel/sub-band it is allocated and/or whether the sub-channel/sub-band is available for spatial reuse, information about the STAs that are scheduled in the multi-user transmission (e.g., a re-transmission of the e.g., 11-bit bitmap indicating what sub-channels are available for reuse and/or information on the specific STAs allocated to one or more, or each, sub-channel); and/or information about a sub-set of the STAs that are scheduled in the multi-user transmission (e.g., scheduled STAs that are within a specific path-loss distance from the resending STA).

In one or more techniques described herein, the terms sub-channel and sub-band may be used interchangeably.

As described herein, channels and/or bands may include one or more Resource Units. For example, in a 20 MHz channel with 26 tone RUs, one or more techniques may be implemented on a 26-tone granularity. For example, in an 80 MHz channel, one or more techniques may be implemented on a 242-tone granularity (or 20 MHz granularity).

One or more techniques may be implemented on 20 MHz channels, and perhaps only on such channels. One or more techniques may be implemented with less than 20 MHz granularity.

In one or more techniques, an UL-OFDMA-STA may be a STA to which the AP is transmitting in the transmission and/or primary BSS. In one or more techniques, an UL-OFDMA STA may be referred to as an UL primary BSS STA.

In one or more techniques, an OBSS STA may be a STA in the overlapping BSS (OBSS) that may transmit, or might not transmit, in a spatial reuse manner, perhaps for example based on what the OBSS STA may hear (e.g., overhear) from the AP and/or from the relay SR transmission from the UL-OFDMA STA (e.g., a retransmission from the UL-OFDMA STA of the SR information received from the AP).

Figure 6:
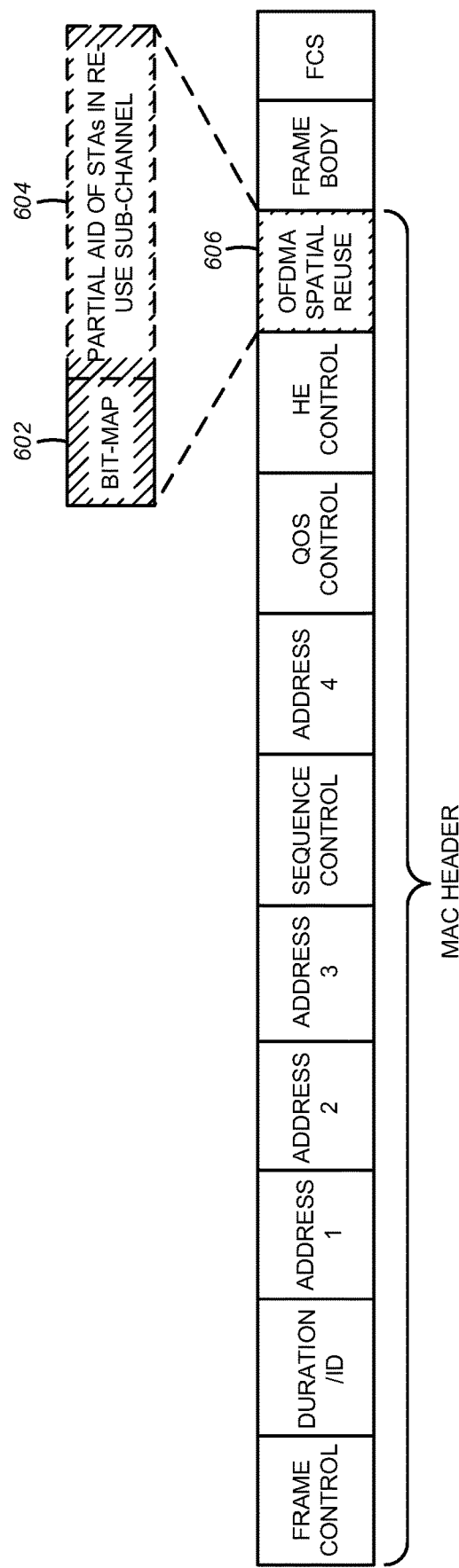
FIG. 6 is an example MAC header with OPFDMA spatial reuse information that can be used with systems, devices, and/or methods described herein.
Figure 7:
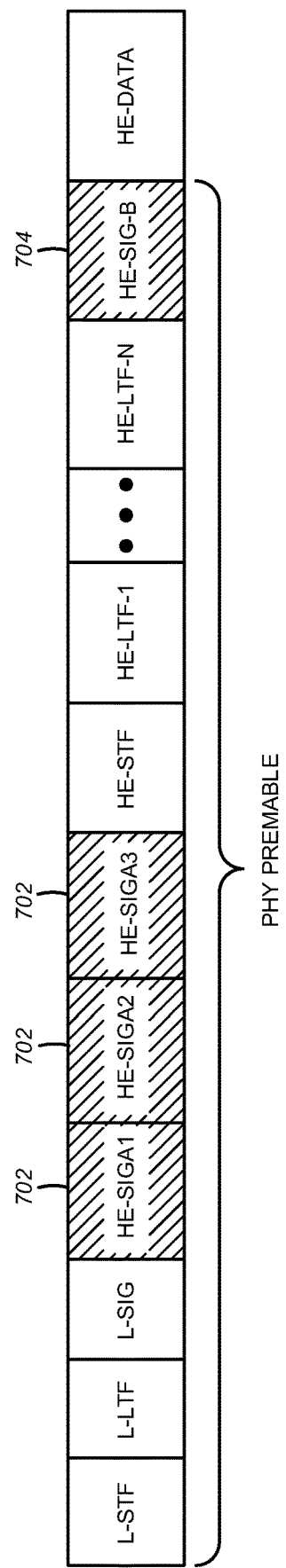
FIG. 7 is an example of a PHY preamble with OFDMA spatial reuse information that can be used with systems, devices, and/or methods described herein.

Signaling of the information discussed herein may by a dedicated MAC frame as shown in FIG. 6, which shows a MAC header with OFDMA spatial reuse information. In FIG. 6, the OFDMA Spatial Reuse 606 in the MAC Header has been expanded to include the bit-map 602 and/or the partial aid of STAs in reuse sub-channel 604 fields. The information may be signaled in a PHY preamble (SIG-A/SIG-B) as shown in FIG. 7, which shows PHY preamble with OFDMA spatial reuse information. FIG. 7 shows the SIG-A 702 which includes the HE-SIGA1, HE-SIGA2, and/or HE-SIGA3 fields and/or 704 SIG-B fields in an example using 802.11ax. The information may be placed in any of the fields. The invention is not limited to 802.11ax and/or any suitable format and/or standard can be used. The MAC frame may use too much processing and/or may decode over the same bandwidth being used by the transmitter. The PHY preamble may be faster and/or may be decodable over the entire bandwidth.

The use of explicit sub-channel signaling information in UL OFDMA transmission is discussed herein. The AP may have polled one or more, or each, of the STAs to find out if they have information to transmit and/or is about to send out an UL OFDMA schedule/trigger frame (for example trigger-based UL and/or similar) to indicate that the STAs may begin transmitting. The AP may send an UL OFDMA schedule/trigger frame to the UL OFDMA STAs. The scheduled frame may comprise information on one or more of the following: the STAs to be scheduled, their allocated sub-channels, and/or a bit-map indicating sub-channels available for spatial sharing by OBSS STAs in neighboring BSSs. OBSS STAs may decode this information and/or may do so based on the available sub-channels and/or may send information in these sub-channels (e.g., only these sub-channels).

The UL OFDMA STAs may transmit data to the AP. One or more, or each, transmitted frame may comprise one or more of the following: a map indicating sub-channels available for spatial sharing by OBSS STAs in neighboring BSSs (e.g., rather than information on other sub-channels, a STA may re-transmit information on its sub-channel, e.g., only its sub-channel), information on the STAs that will be transmitting data in the UL OFDMA transmission (e.g., the Partial AID of the STAs that are transmitting on the different sub-channels), transmission power information, and/or information on the TxOP duration of the entire OFDMA transmission, information on the data transmission duration of the specific STA, data to be transmitted. The map indicating the sub-channels available and/or the data to be transmitted may be placed in the PHY header and/or a separate aggregated MAC subframe that may be decoded early.

For example, an UL OFDMA STA in first BSS may receive specific information from an access point (AP) device in the first BSS. The specific information may regard one or more sub-bands' potential for OBSS spatial reuse (OBSS SR) for uplink (UL) communication by one or more STAs in a second BSS. The specific information may include one or more thresholds related to each of the one or more sub-bands' potential for OBSS SR for the UL communication. The UL OFDMA STA may send a transmission that may include at least some of the specific information to the AP and/or one or more other stations (STAs) in the first BSS. The transmission may be detectable by at least one STA of the one or more STAs in the second BSS (for example, to which the transmission was not specifically directed). For example, the UL OFDMA may function as a relay of at least some of the specific information.

An OBSS STA in a neighboring BSS may overhear either the original transmission by the AP and/or the retransmission by the STA about the sub-channel usage. The OBSS STA may transmit data on sub-channels identified as available sub-channels in the map (e.g., sub-channels that may be transmitting/receiving to/from STAs that are robust to neighboring OBSS interference). The OBSS STA may use knowledge of the STAs in its vicinity and/or information on the specific STAs assigned to one or more, or each, sub-channel to identify sub-channels that might not be affected if it transmits. The OBSS STA may begin CSMA/CA access in the available sub-channels. In the scenario where the sub-channel size is less than 20 MHz, the OBSS STA may limit its transmission to that sub-channel. The OBSS STA may increase its transmission power in the case of a sub-channel transmission in order to maintain the same power across one or more, or all OFDMA symbols transmitted. In this case, the identification of available sub-channels may have to take this into consideration. The neighboring BSS information transmitted may include a power margin that indicates the allowable increase in power for any neighboring cell transmission and/or a desired received power that a neighboring STA may use to estimate its allowable transmit power. Other nodes may account for this variation in energy in the channel when performing clear channel assessment. On successful reception of the transmitted data in the primary BSS, one or more, or each, STA may send an ACK to the AP. The ACKs may be sent concurrently.

Figure 8:
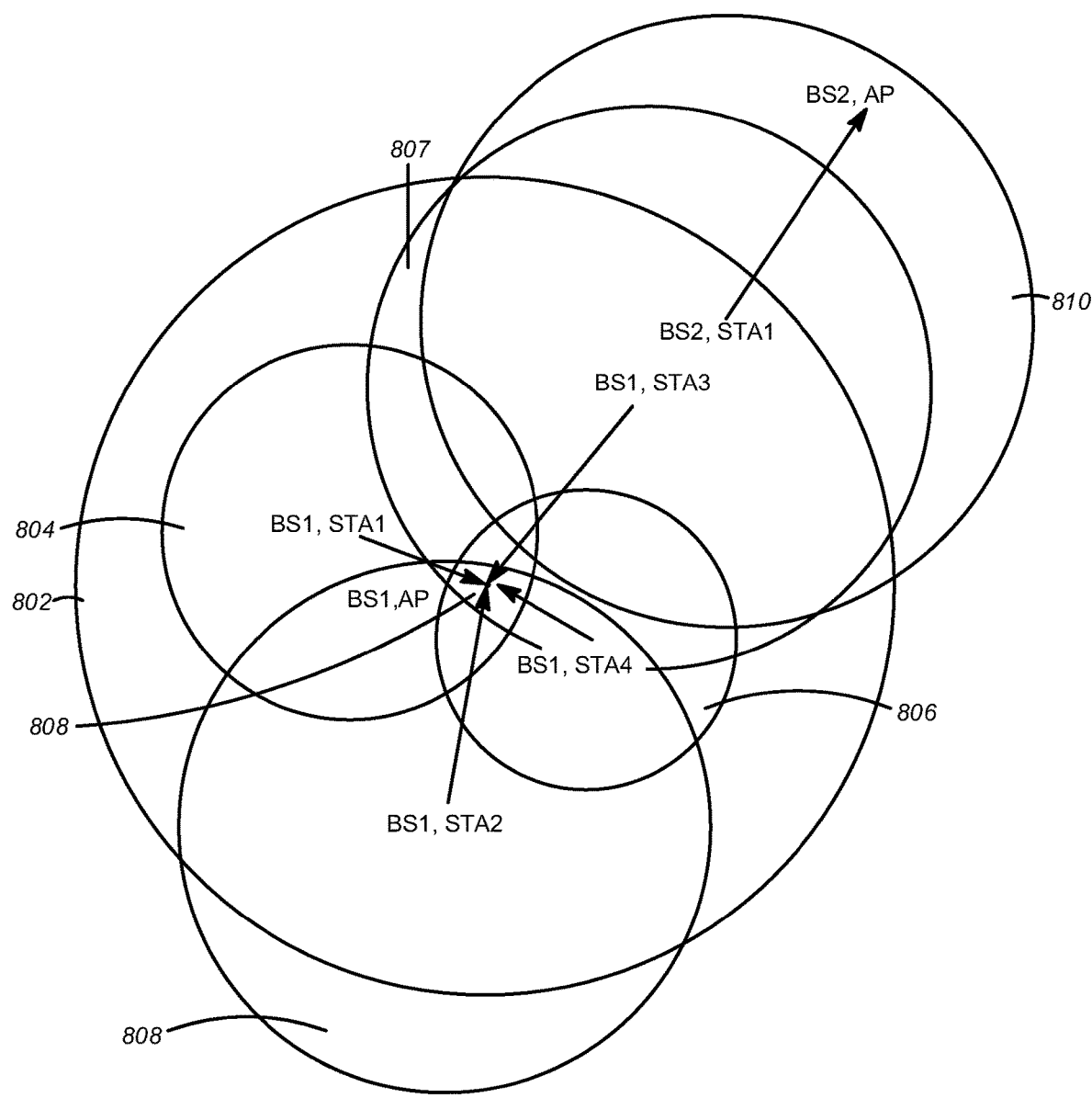
FIG. 8 is an example diagram of an OBSS network with OFDMA transmissions that can be used with systems, devices, and/or methods described herein.
Figure 9:
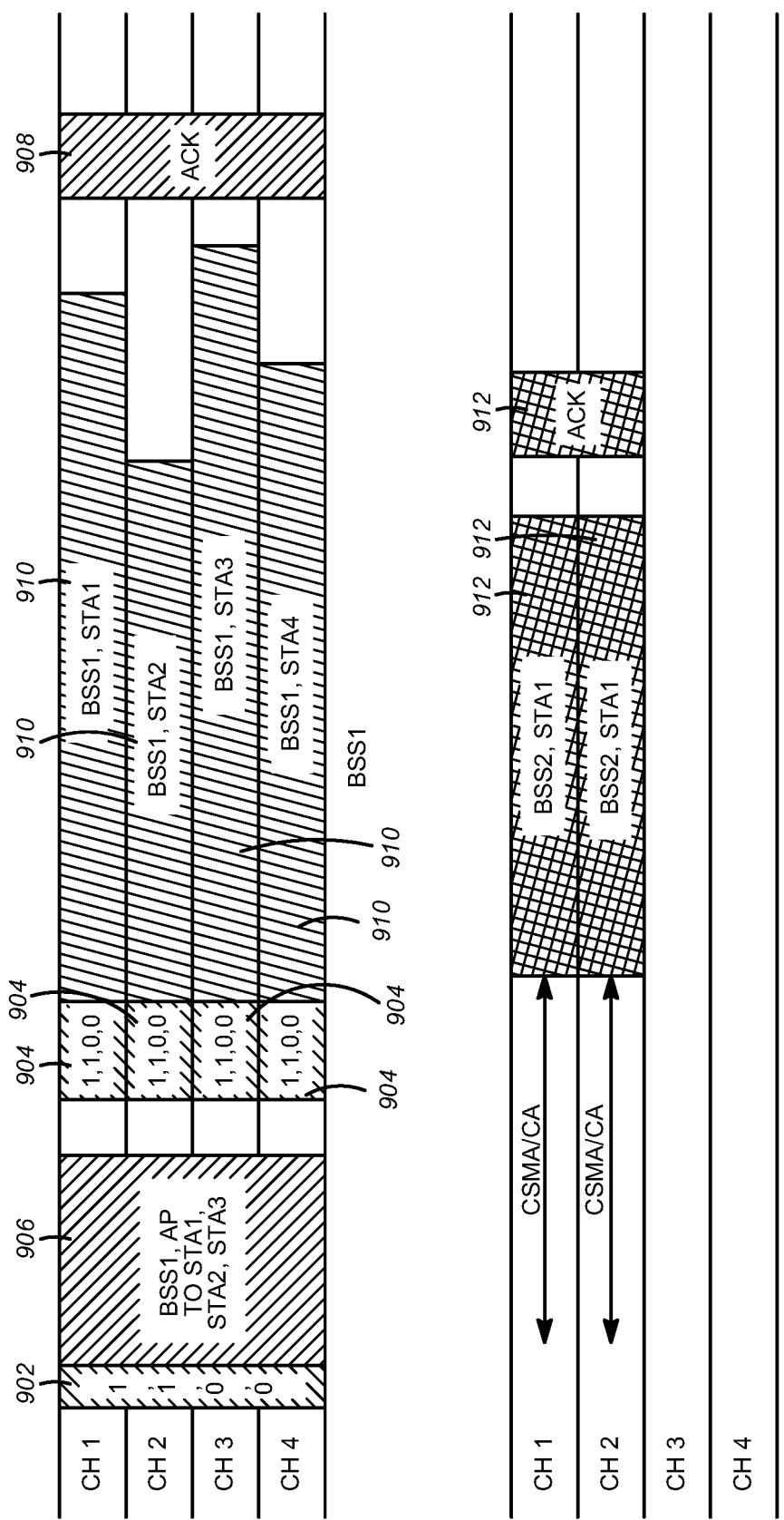
FIG. 9 is an example of an explicit signaling procedure for modified spatial reuse in UL OFDMA transmission showing reuse information for one or more, or all, sub-channels retransmitted by one or more, or each, STA that may be used with systems, devices, and/or methods described herein.
Figure 10:
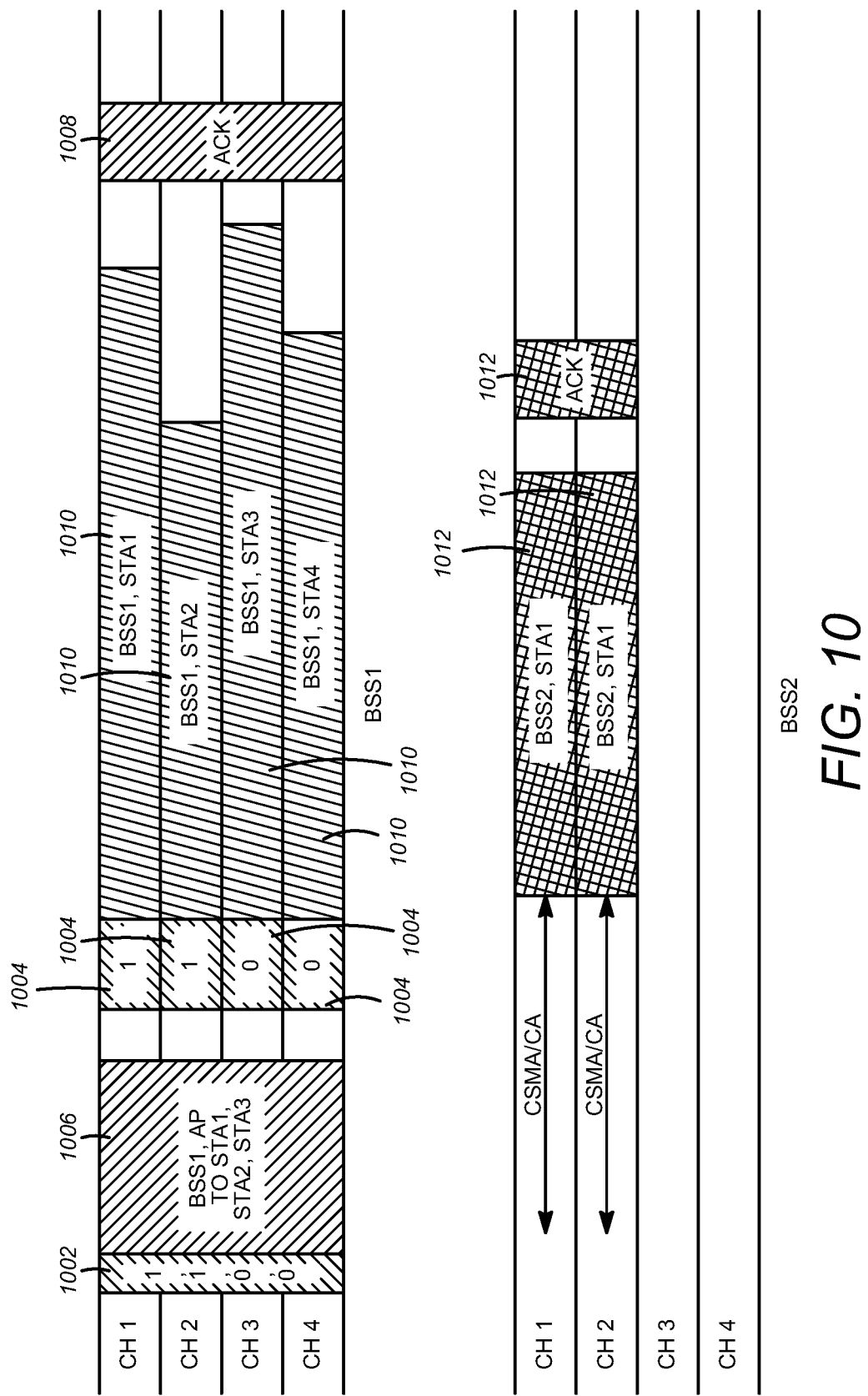
FIG. 10 is an example of explicit signaling procedure for modified spatial reuse in UL OFDMA transmission showing reuse information for specific sub-channel retransmitted by one or more, or each, STA that may be used with systems, devices, and/or methods described herein.

FIG. 8-10 illustrate an example network with OBSS neighbors and/or an uplink OFDMA transmission and shows the transmission in scenarios including (a) reuse information for one or more, or all, sub-channels are retransmitted by one or more, or each, STA to the neighboring BSS and/or (b) reuse information for specific sub-channel retransmitted by one or more, or each, STA to the neighboring BSS. FIG. 8 depicts an example of explicit signaling procedure for improved spatial reuse in UL OFDMA transmission: reuse information for one or more, or all sub-channels retransmitted by one or more, or each, STA. As shown in FIG. 8, BS1 contains STA1, STA2, STA3, and/or STA4. In the diagram, circle 802 indicates the logical boundaries of BS1. Circles 802, 804, 806, 807 indicate the area around the area for one or more, or each, STA that is affected by transmission from that STA based on its transmit power. In FIG. 8 it can be seen that the circles 802, 804, 806 overlap at BS1 AP 808. As is also depicted, BS2 contains BS2, STA1 and/or BS2 AP. In FIG. 8, circle 810 indicates the range of the CCA threshold for BS2 STA1. As circle 801 intersects with BS1 STA1, BS1 STA3 and/or BS1 STA4, the OBSS STA may be prevented from transmitting. Explicit signaling may be used to enable BS2 STA1 to transmit on specific sub-channels. FIG. 9 is an example of an explicit signaling procedure for modified spatial reuse in UL OFDMA transmission showing reuse information for one or more, or all, sub-channels retransmitted by one or more, or each, STA. FIG. 10 depicts an example of explicit signaling procedure for modified spatial reuse in UL OFDMA transmission showing reuse information for specific sub-channel retransmitted by one or more, or each, STA. The information may be transmitted on one or more frame or all frames of an OFDMA transmission in an OFDMA TxOP. The information transmitted may also be used in scenarios where a partially-hidden node may miss the schedule/trigger frame assigning STAs to an UL-OFDMA transmission. One or more, or each, STA may transmit information in its preamble/MAC header indicating the occurrence of an UL-OFDMA transmission and/or the overall transmission bandwidth. Partially hidden nodes may decode this information and, perhaps for example based on that, may prevent collisions.

In FIG. 9 and FIG. 10, the explicit signaling is indicated by the preamble 902, 904, 1002, 1004 (on one or more, or all, of the transmitted frames in the OFDMA TxOP). The frames 906, 908, 1006, 1008 are the OFDMA control frames sent by the AP to schedule the OFDMA transmission and/or acknowledge a successful transmission. The AP may send information for spatial reuse for respective sub-channels/sub-bands, such as for example specific information on a sub-channel/sub-band basis for OBSS spatial reuse. The information for OBSS spatial reuse for the respective sub-channels/sub-bands may be similar and/or different for one or more, or each, respective sub-channel/sub-band. The information for spatial reuse may correspond to the potential of a specific sub-band(s) for spatial reuse, for example OBSS spatial reuse. The frames 910, 1010 are the OFDMA frames transmitted by the STAs to the AP in the primary BSS while the frames 912, 1012 are the data transmitted by the OBSS STA(s) based on the spatial reuse information sent in the preamble of the neighboring BSSs.

OFDMA based clear channel assessment (CCA) is described herein. Static and dynamic OFDMA-based CCA threshold settings are described herein. Examples may include one or more of the following scenarios. APs and/or STAs may signal their capability of performing (a) OFDMA transmission and/or (b) sub-channel CCA estimation. The nodes may agree on their signal transmission bandwidth and/or corresponding CCA threshold. The value of the signal bandwidth may be 20 MHz, 40 MHz, . . . 160 MHz, and/or 80+80 MHz. This may be based on the numerology of the 802.11 technology used. The value of the CCA threshold may be set based on a fixed value and/or a dynamic value. The AP may send information for spatial reuse for respective sub-channels/sub-bands, such as for example specific information on a sub-channel/sub-band basis. The information for spatial reuse may correspond to the potential of a specific sub-band(s) for spatial reuse, for example OBSS spatial reuse. The information for OBSS spatial reuse for the respective sub-channels/sub-bands may be similar and/or different for one or more, or each, respective sub-channel/sub-band. For example, the AP may indicate a similar and/or different CCA thresholds/levels that may be acceptable for clear channel assessment and/or OBSS spatial reuse for one or more sub-channels/sub-bands.

Fixed CCA value: for an HE STA with the operating channel width equal to 20 MHz, the start of a valid 20 MHz HE signal at a receive level equal to or greater than the minimum modulation and/or coding rate sensitivity given by CCA_STA(dBm) may cause the PHY to set PHY-CCA.indicate(BUSY) with a probability>90% within 4 is. The receiver may hold the CCA signal busy for a signal energy detect_margin (dB) and/or more above the minimum modulation and/or coding rate sensitivity (e.g., (CCA_STA+Energy_detect_margin (dBm)) in the 20 MHz channel (IEEE Std 802.11 ™-2012: Wireless LAN Medium Access Control (MAC) and/or Physical Layer (PHY) Specifications, 20.3.21.5.2). A receiver that does not support the reception of HE format PPDUs may hold the CCA signal busy (PHY_CCA.indicate(BUSY)) for any valid HE signal in the 20 MHz channel at a receive level equal to or greater than (CCA_STA+non-HE_margin) (dBm)

Dynamic CCA value: for an HE STA with the operating channel bandwidth equal to 20 MHz, the start of a valid 20 MHz HE signal at a receive level equal to or greater than the STA specific margin given by CCA_STA (dBm)=CCA_nominal−STA_specific_margin (dBm) may cause the PHY to set PHY-CCA.indicate(BUSY) with a probability>90% within 4 is. The receiver may hold the CCA signal busy for any signal that may be x dB and/or more above the minimum modulation and/or coding rate sensitivity where x is a STA specific value. A receiver that does not support the reception of HE format PPDUs may hold the CCA signal busy (PHY_CCA.indicate(BUSY)) for any valid HE signal in the 20 MHz channel at a receive level equal to or greater than (CCA_nominal+non-HE_margin−STA_specific_margin (dBm)) (dBm). The STA specific margin may be set based on path loss and/or transmit power. The STA specific margin may be set to ensure that STAs that are closer to the BSS center may have a higher CCA margin (e.g., they may be more aggressive in deciding on an empty channel as they have a lower probability of impacting neighboring BSS transmission). The thresholds, be they static and/or dynamic, may be determined (for example, by the AP) on a per-sub-channel basis. The thresholds may be the same or different for one or more sub-channels.

The nodes may agree on their signal sub-channel size and/or CCA_sub_level_threshold. The value for the sub-channel bandwidth may be predetermined by (e.g., predetermined by the standard) and/or set dynamically. This may be 20 MHz, 5 MHz, and/or 2.5 MHz sub-channels. The sub-channel and/or resource unit bandwidth may be fixed based on an agreed numerology. In one example, the following numerology in a transmission bandwidth of 20 MHz may be used: Resource Unit (RU9) of 26-tone with 2 pilots, RU4 of 52-tone with 4 pilots, RU2 of 102 data tone plus 4 to 6 pilots, and/or RU1 of 242-tone with 8 pilots. The sub-channel CCA level may be fixed and/or set dynamically per STA and/or may be a function of the sub-channel size selected, the CCA_threshold set for the transmission bandwidth (as in 1.b) and/or the power transmission mode. An OFDMA sub-channel penalty of OFDMA_sub_penalty may be set that may depend on the OFDMA sub-channel size. The penalty may be calculated as 10*log 10(number of sub_channels_in 20 MHz) dB. This is illustrated in Table 1:

TABLE 1

Examples of OFDMA sub-channel penalty

| OFDMA sub-channel size (MHz), n | Number of sub-channels in 20 MHz | Penalty (dB) |
|---|---|---|
| 10 | 2 | 3 |
| 5 | 4 | 6 |
| 2.5 | 8 | 9 |

An OFDMA sub-channel penalty of OFDMA_sub_penalty may be set and/or may depend on the OFDMA RU size, as shown in Table 2:

TABLE 2

Examples of OFDMA sub-channel/RU number penalty

| OFDMA sub-channel size (MHz), n | Number of RUs in 20 MHz | Penalty (dB) |
|---|---|---|
| RU9 | 9 | 9.54 |
| RU4 | 4 | 6 |
| RU2 | 2 | 3 |
| RU1 | 1 | 0 |

A TP_mode_margin may be added. The power transmission mode may be dependent on constant power transmission: in which the total transmit power may be used in the resource units allocated (TP_mode_margin=−OFDMA_sub_penalty) and/or constant power spectral density transmission: in which the total transmit power spectral density is kept constant. In this case, the total transmit power is scaled based on the resource units allocated and/or TP_mode_margin=0.

An OFDMA_margin may be set to allow for a higher/lower CCA threshold, perhaps for example on a sub-channel/sub-band basis.

An HE STA with the operating sub-channel channel bandwidth equal to n MHz, may set its sub-channel_CCA_level based on Sub_channel_CCA_level (dBm)=f (CCA_STA (dBm), sub_channel_size_Penalty (dB), Transmit Power mode, OFDMA_margin) (dBm) In one example, Sub_channel_CCA_level (dBm)=CCA_STA (dBm)−Penalty (dB)−OFDMA_margin+TP_mode_margin (dBm) and/or for energy levels within the sub-channel bandwidth greater than or equal to this value, may cause the PHY to set PHY-CCA.sub_channel_indicate(BUSY) with a probability>90% within 4 μs. The CCA_level_sub_channel and/or sub-channel size may be pre-estimated and/or set.

Figure 11A:
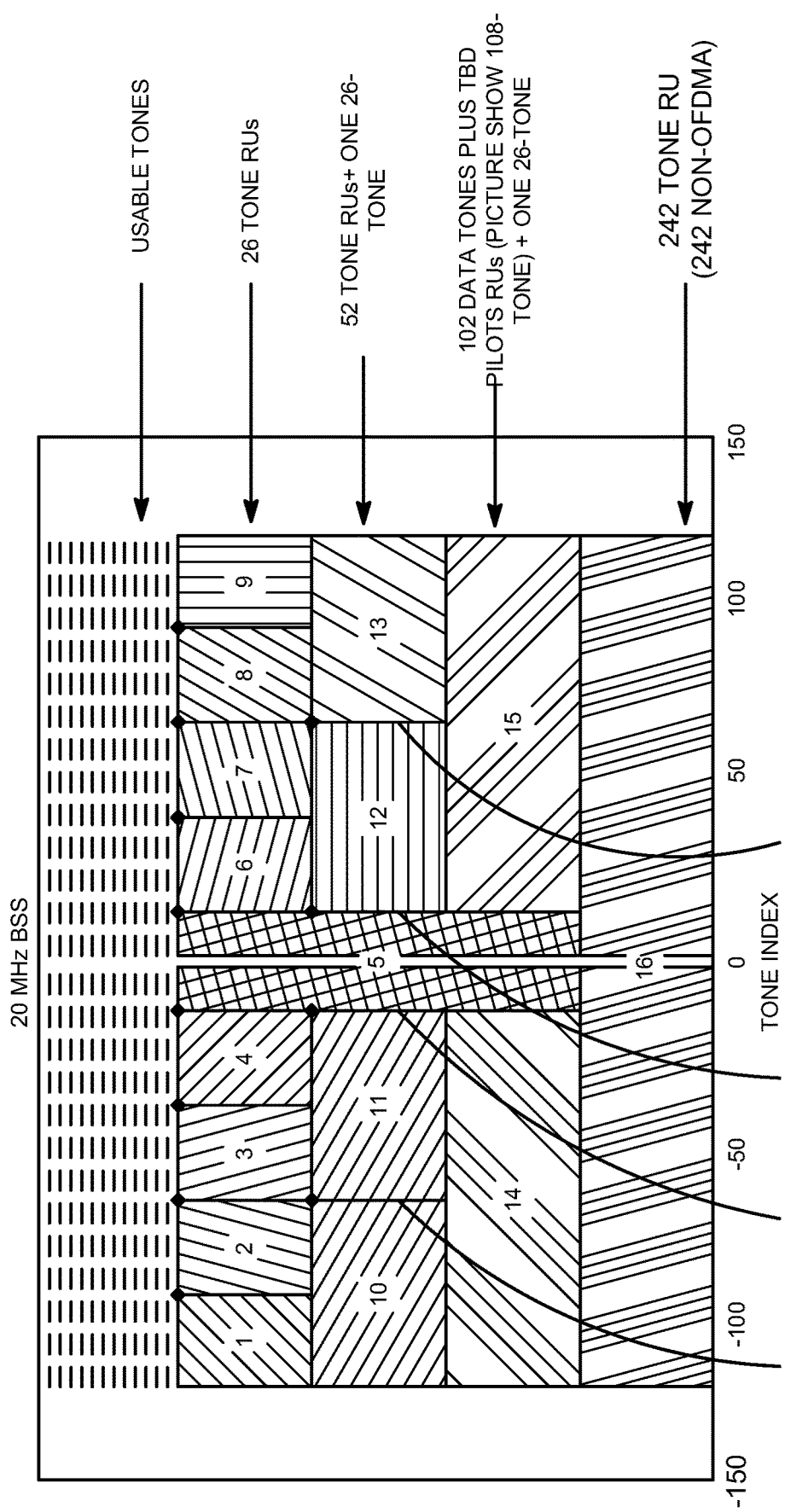
FIG. 11A is an example of OFDMA numerology that may be used with systems, devices, and/or methods described herein.
Figure 11B:
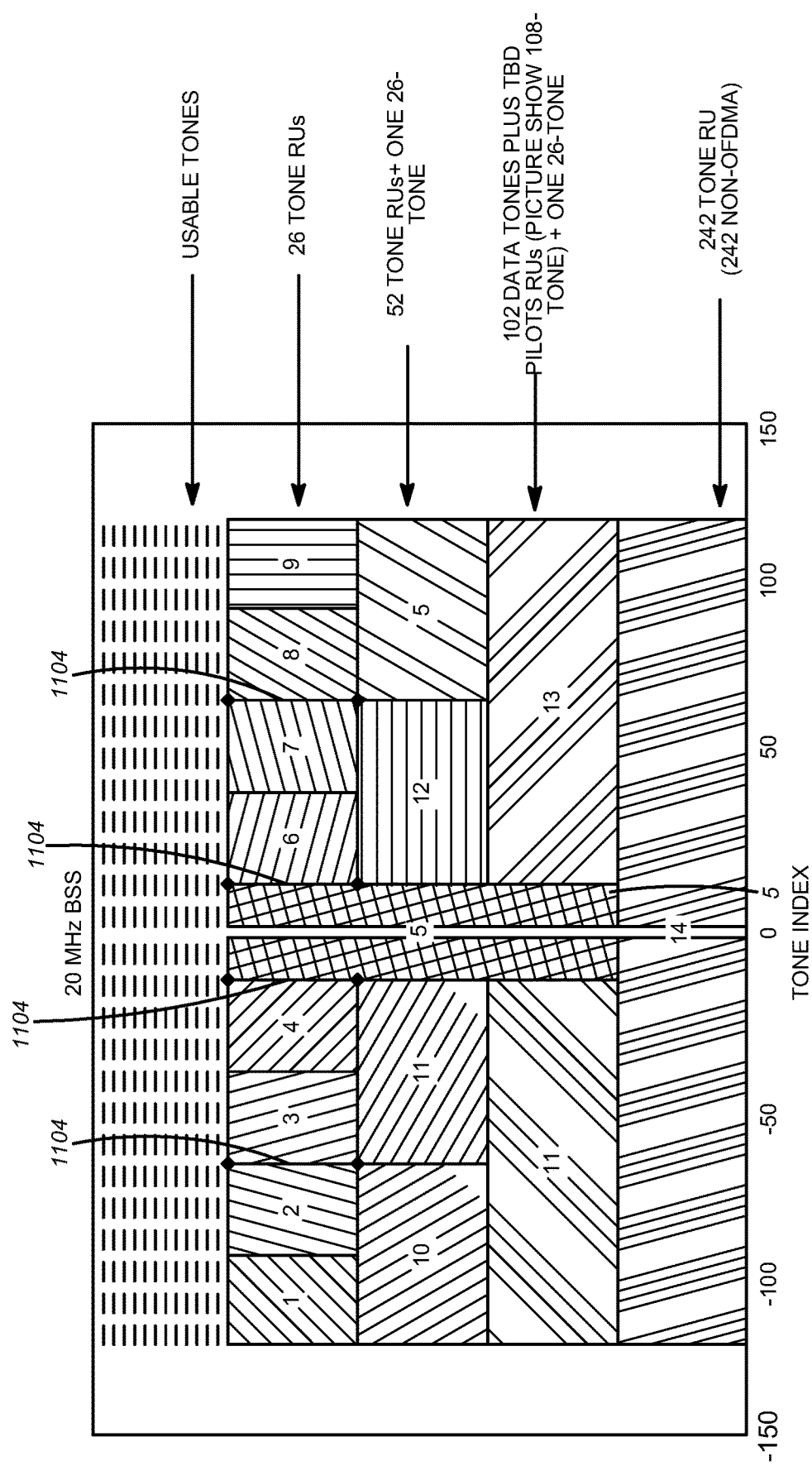
FIG. 11B is an example of OFDMA numerology that may be used with systems, devices, and/or methods described herein.

An example (for example, exhaustive) sub-channel CCA is described. An STA may sweep through possible OFDMA sub-channel assignments (e.g., one or more, or all possible OFDMA sub-channel assignments). For example, a possible numerology for 802.11ax transmitting in 20 MHz is shown in FIG. 11A. A total of 16 CCA threshold comparisons may be performed, which may include one or more of the following: nine comparisons for RU9 with 26 tone RUs (channels 1 to 9 in FIG. 11A); 4 comparisons for RU5 with 52 tone RUs+one 26 tone RU (for example, the 26 tone RU has already been compared) (channels 10-13 in FIG. 11A); two comparisons for RU3 with 102 data tones+one 26 tone RU (channels 14 and/or 15 in FIG. 11A); and/or one comparison for the 242 tone RU (channel 16 in FIG. 11A). The channel 16 comparison may be similar to previous CCA threshold measurement and/or comparison. One or more, or each, energy measurement may be performed in the analogue domain, e.g., based on a time-domain energy measurement performed after a filter isolates the desired frequency. One or more, or each, energy measurement may be performed in the digital domain, e.g., after an FFT processing of the received signal. The energy in the desired tones may be measured and/or compared with a threshold as discussed earlier. FIG. 11B is another example with channels 1-14.

Figure 12:
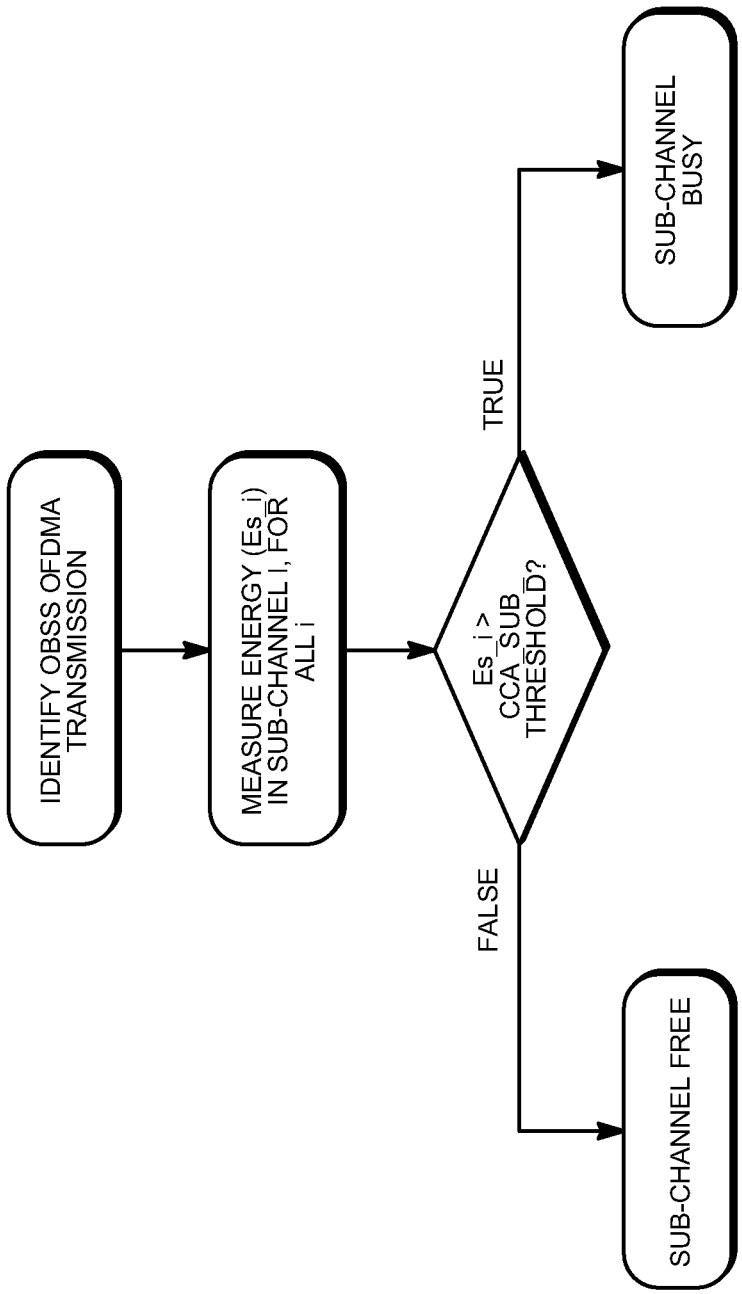
FIG. 12 is an example exhaustive CCA procedure that may be used with systems, devices, and/or methods described herein.

For CCA, a transmission bandwidth with a corresponding CCA threshold of {CCA_tx} and/or sub-channel bandwidth(s) with corresponding CCA threshold(s) of {CCA_sub_tx} may be assumed. PHY_CCA.indication may be set to 0 for transmission bandwidth {CCA_tx} if the energy in the channel does not exceed the threshold. This may ensure that legacy STAs are accounted for. PHY_CCA.indication may be set to 1 for transmission bandwidth {CCA_tx} and/or frame duration (d) if the energy in the channel exceeds the CCA threshold. For the sub-channel based CCA procedure, sub-channel CCA estimation may be started. The energy for one or more, or each, sub-channel may be measured. For one or more, or each, sub-channel, PHY_CCA.sub-channel_indication may be set to 0 for sub-channel bandwidth {CCA_sub_tx} if the energy in the sub-channel does not exceed the CCA_level_sub_channel threshold. PHY_CCA.sub-channel_indication may be set to 1 for sub-channel size {CCA_sub_tx} if the energy in the sub-channel exceeds the CCA_level_sub_channel threshold. An example technique is illustrated in FIG. 12.

Figure 13:
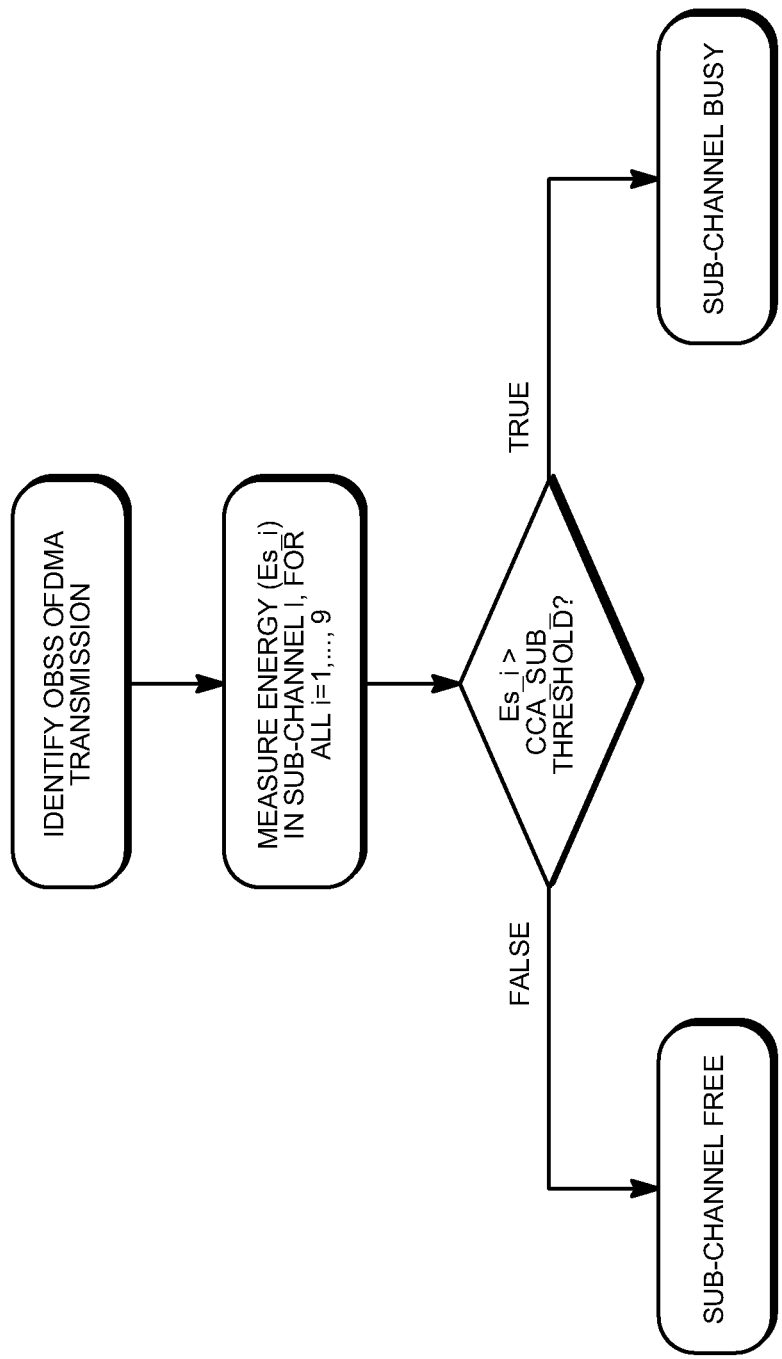
FIG. 13 is an example exhaustive OFDMA based CCA based on RU9 that may be used with systems, devices, and/or methods described herein.

A simplified sub-channel based CCA may be provided. One or more, or each, STA may sweep through CCA comparisons (e.g., one or more, or all 9 CCA comparisons assuming a 26 tone RU allocation. This may reduce the complexity when compared with the exhaustive method. The CCA threshold used may assume that the energy is transmitted across the entire bandwidth. The channel may be identified as busy even in a one RU allocation scenario. For the sub-channel based CCA procedure, start sub-channel CCA estimation. The energy may be measured for one or more, or each, sub-channel. For one or more, or each, sub-channel, PHY_CCA.sub-channel_indication may be set to 0 for sub-channel bandwidth {CCA_sub_tx} if the energy in the sub-channel does not exceed the CCA_level_sub_channel threshold. PHY_CCA.sub-channel_indication may be set to 1 for sub-channel size {CCA_sub_tx} if the energy in the sub-channel exceeds the CCA_level_sub_channel threshold. An example technique is illustrated in FIG. 13.

Figure 14A:
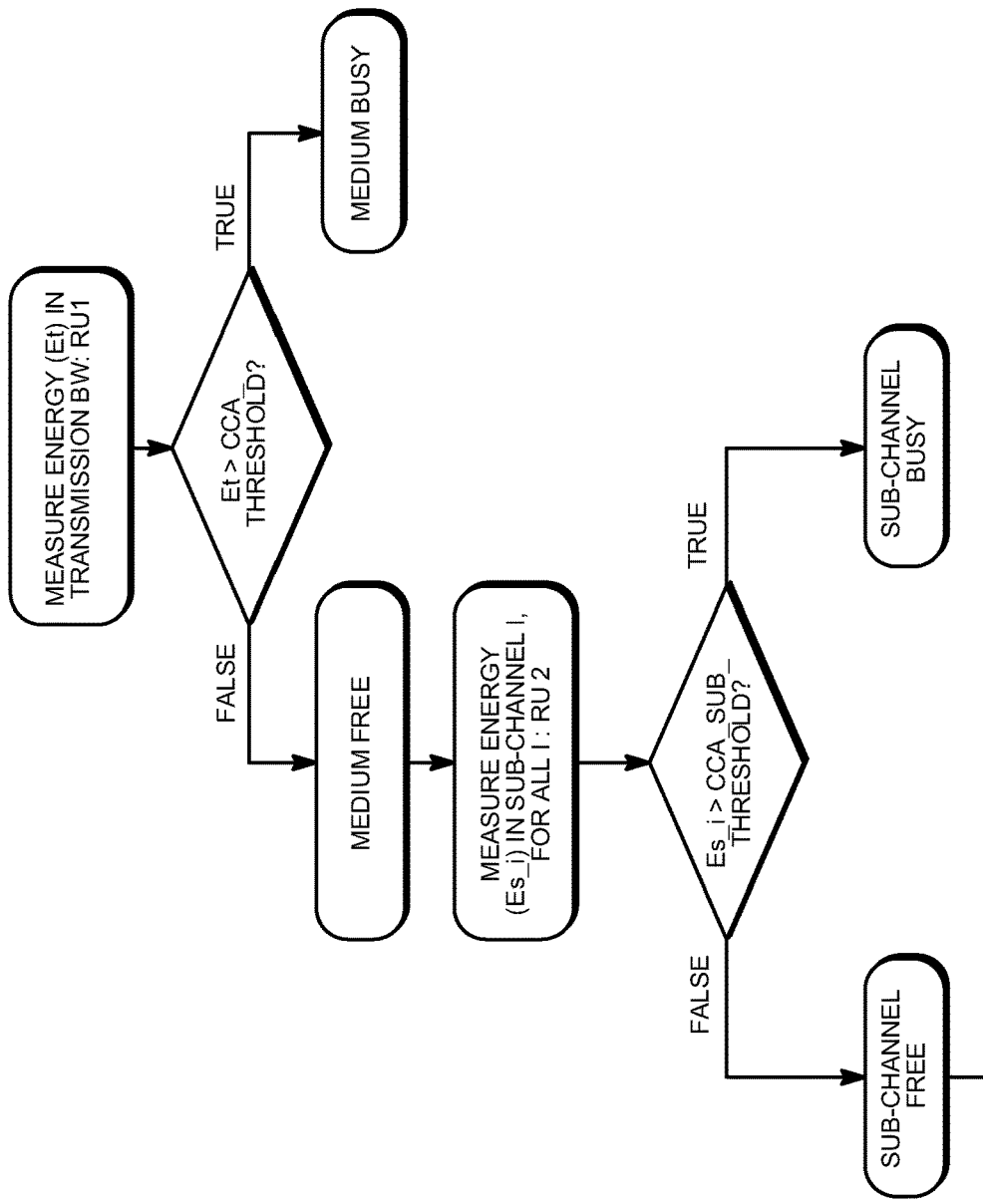
FIG. 14A and FIG. 14B are an example hierarchical sub-channel based CCA procedure that may be used with systems, devices, and/or methods described herein.
Figure 14B:
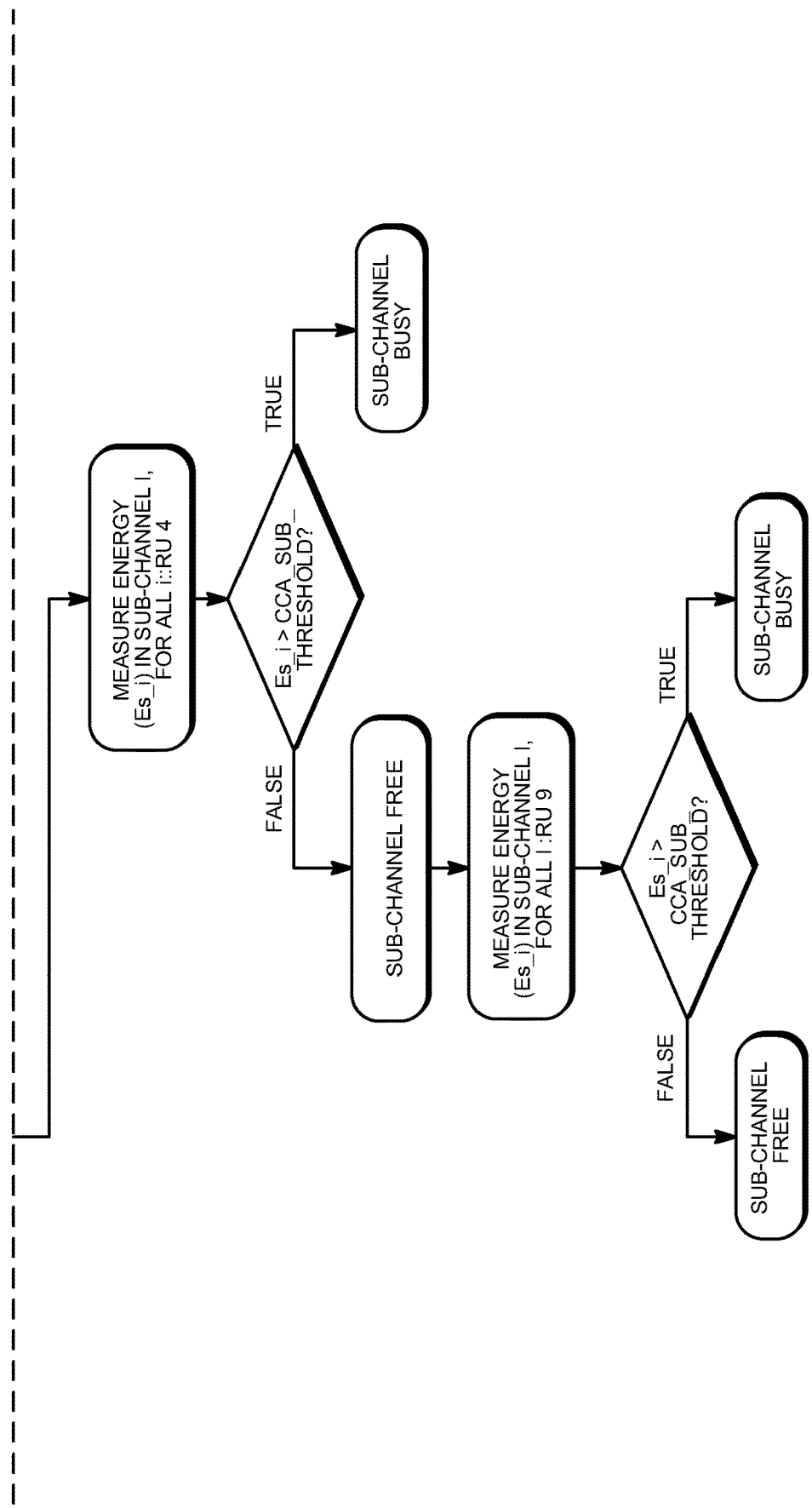

The systems, devices, and/or methods described herein may include a hierarchical sub-channel based CCA procedure. There may be scenarios where the STA identify the channel as busy and/or might not identify any unused and/or partially used channel. This may occur for non-OBSS STAs seeking to identify if there is any transmission in the channel to prevent partially hidden nodes. It may also occur for non-OBSS STAs that may wake up during a transmission. The STA may initiate the following, which may include one or more of the following. Perform a CCA on RU 1 using the RU1 threshold. If the channel is busy, indicate channel_busy and/or end. If the channel is not busy, perform a CCA on RU2. If the channel is busy, indicate channel busy and/or end. If channel is not busy, perform a CCA on RU4. If the channel is busy, indicate channel busy and/or end. If the channel is not busy, perform a CCA on RU9. If the channel is busy, indicate channel busy and/or end. Indicate channel is not busy. An example technique is illustrated in FIG. 14A and FIG. 14B.

Figure 15:
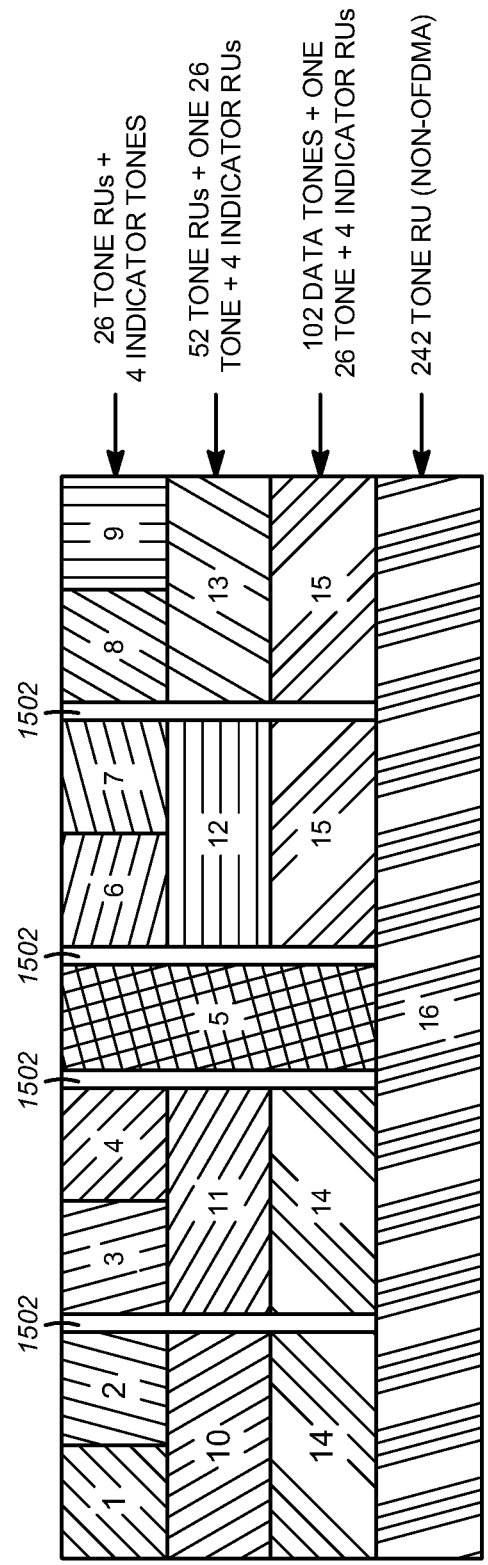
FIG. 15 is an example numerology with indicator tones that may be used with systems, devices, and/or methods described herein.

The systems, devices, and/or methods described herein may include a busy sub-channel and/or indicator-tine method and/or system. A set of indicator channels that indicate an OFDMA transmission may occurring may be used. A set of unused tones may be allocated for this purpose. One of the RU9 tones (as shown in FIG. 11A) may be used for this purpose. FIG. 11A illustrates an example numerology, e.g., proposed for 802.11ax. In FIG. 11A, the lines 1102 indicate un-allocated and/or un-used tones. FIG. 11B is another example numerology. In FIG. 11B, the black lines 1104 indicate un-allocated and/or un-used tones. To help identify if there is an OFDMA transmission in progress, energy may be placed in these unused tones by any transmitting STA. Energy may be placed on the central 26-tone RU-9 sub-channel as it is common to one or more, or all of the OFDMA sub-channel allocations. A transmitting STA may adjust the energy transmitted in these tones based on the number of STAs transmitting simultaneously. This may ensure that the energy received at the receiver does not overwhelm the AGC. A STA that desires to transmit may look at the specific tones and/or identify if there is any energy on the channel. This may be based on a comparison of the total energy in the indicator tones with a threshold. This may be done by comparing the energy in the indicator tones with the energy in the other tones. A scenario in which there is a marked increase in energy in the indicator tones compared with the others may indicate the presence of an OFDMA transmission. An example numerology with the indicator tones is shown in FIG. 15. One or more, or each, block in FIG. 15 represents a sub-channel. 1502 are unallocated tones and/or they may be used as the indicator channel. One or more, or each, of the other blocks number 1-16 may be a sub-channel and/or resource unit. Any OFDMA transmission may include energy in the indicator tone positions 1502.

Figure 16:
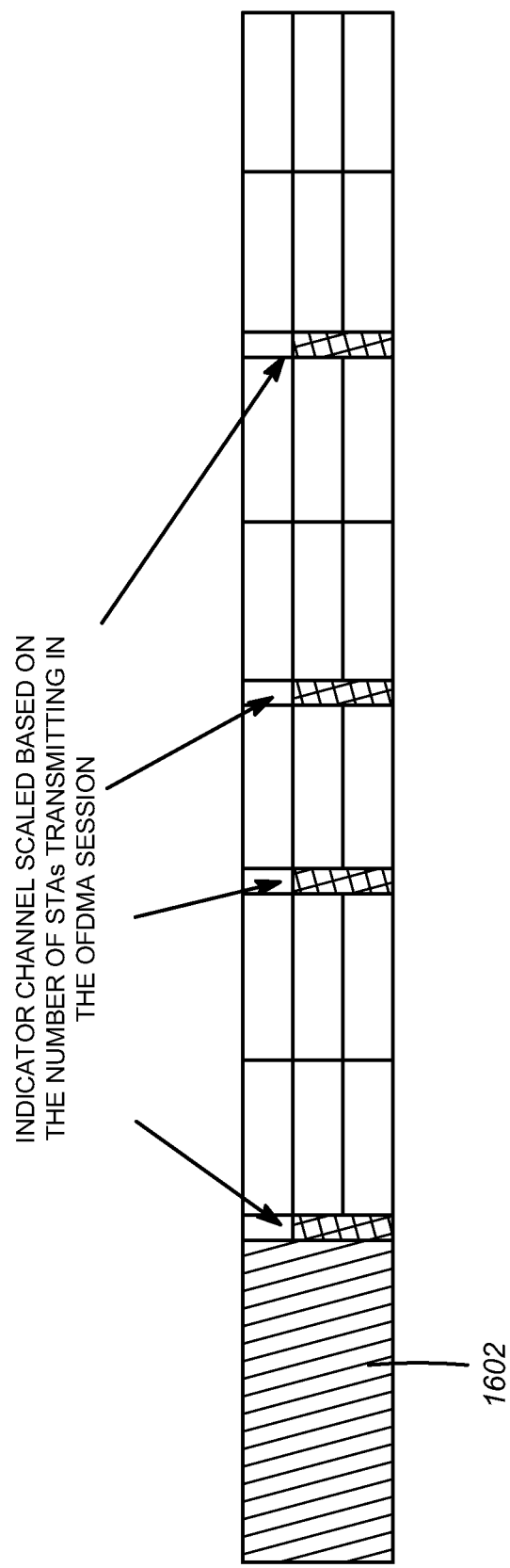
FIG. 16 is an example OFDMA transmission using indictor channels that may be used with systems, devices, and/or methods described herein.
Figure 17:
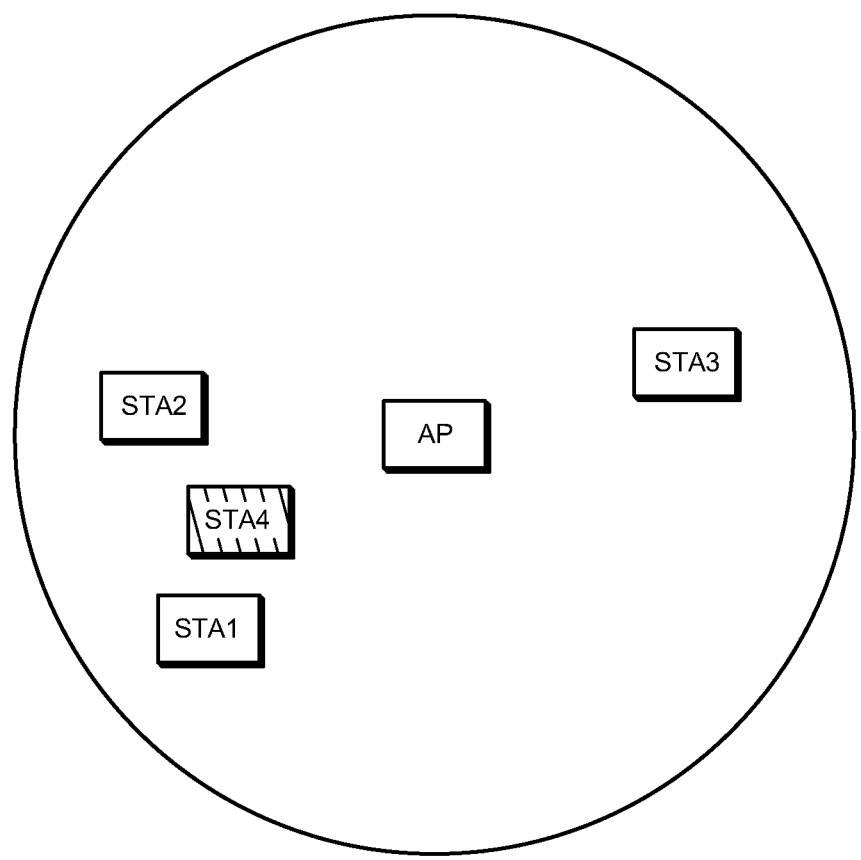
FIG. 17 is an example network that may be used with systems, devices, and/or methods described herein.
Figure 18:
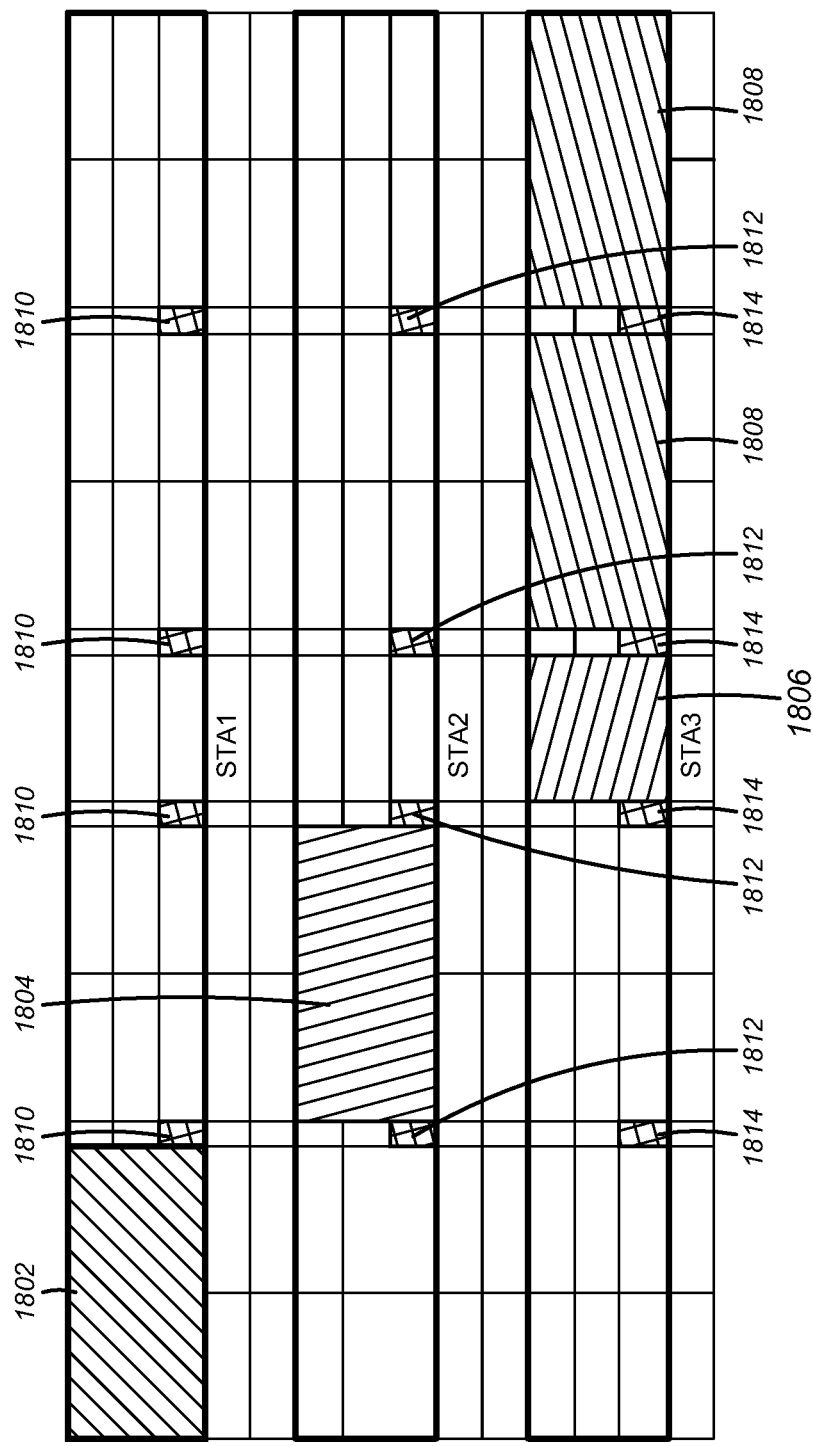
FIG. 18 is an example sub-channel allocation with indicator channels that may be used with systems, devices, and/or methods described herein.
Figure 19:
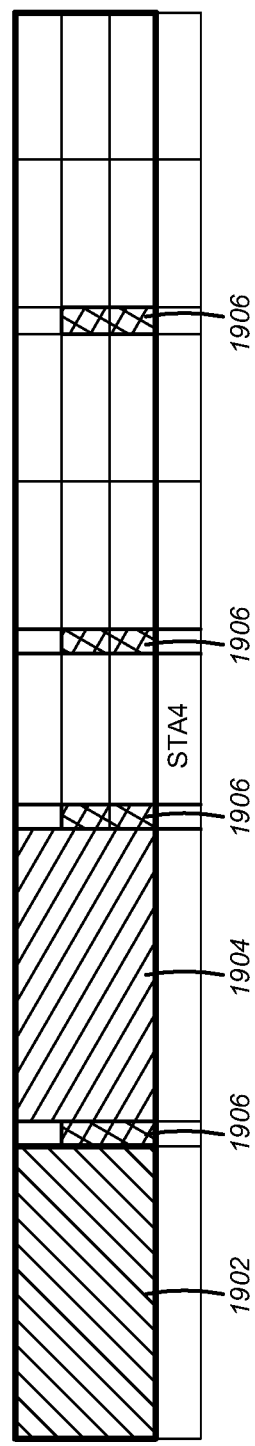
FIG. 19 is an example received signal that may be used with systems, devices, and/or methods described herein.

In FIG. 16, an STA may transmit using the 52 tone RU allocation and/or transmits energy in the indicator tones. 1602 in FIG. 16 signifies the sub-channel the STA is allocated and/or is transmitting on. A STA that may be close to this STA may measure the total energy in the indicator channels and/or compare this to a threshold. The difference in energy between the indicator channels and/or non-indicator channels may be measured. A significant difference may indicate the use of OFDMA transmission. As shown in the example of FIG. 17, STA1 and STA2 are close to each other while STA3 is on the opposite end of the network. The sub-channel allocation and the indicator channels are shown in FIG. 18. In FIG. 18, the blocks 1802, 1804, 1806, and/or 1808 indicate the sub-channel that one or more, or each, STA is allocated and/or is transmitting in. STA1 is allocated a 52 tone sub-channel 1802, STA2 is allocated a 52 tone sub-channel 1804 and STA3 is allocated a 26 tone 1806 and/or 104 tone 1808 sub-channel. STA4 may receive a signal as shown in FIG. 19. One or more, or each, STA sends an indicator tone 1810, 1812, 1814, that may be one-third of the total power per tone. In FIG. 19, the blocks 1902, 1904 indicate the energy received by STA4 from STA1 1902 and STA2 1904. The black bars 1906 indicate the summation of the energy received from STA1 and/or STA2 in the indicator channel. STA1 may perform a previous CCA procedure in the entire transmission bandwidth. This might fail, perhaps for example due to no energy detected in the other sub-bands. STA1 may measure the energy of one or more, or each, indicator channel and/or sub-channel:

sub-channel 1>0, Indicator channel>0;
sub-channel 2>0, Indicator channel>0;
sub-channel 3=0, Indicator channel>0;
Sub-channel 4=0, Indicator channel>0; and/or
Sub-channel 5=0

The energy distribution in the sub-channels and/or the energy in the indicator channels may indicate that an OFDMA transmission is occurring.

The systems, devices, and/or methods described may include transmission using an OFDMA-based CCA method and/or system for spatial reuse in OBSS OFDMA transmission. Information on the sub-channel used by different STAs may be estimated by one or more, or each, OBSS STA. This may be based on a modified CCA procedure to enable the OBSS STAs to identify bands that they may reuse. This is different from that described above in which the information on which sub-channels may be reused is explicitly sent. On receipt of an OFDMA schedule/trigger frame, data transmission frame and/or OFDMA data poll frame, an OBSS STA may initiate a hierarchical CCA mechanism that estimates the energy in one or more, or each, sub-channel and/or estimates if the sub-channel is available for transmission based on a CCA threshold that takes into account the sub-channel size.

Figure 21:
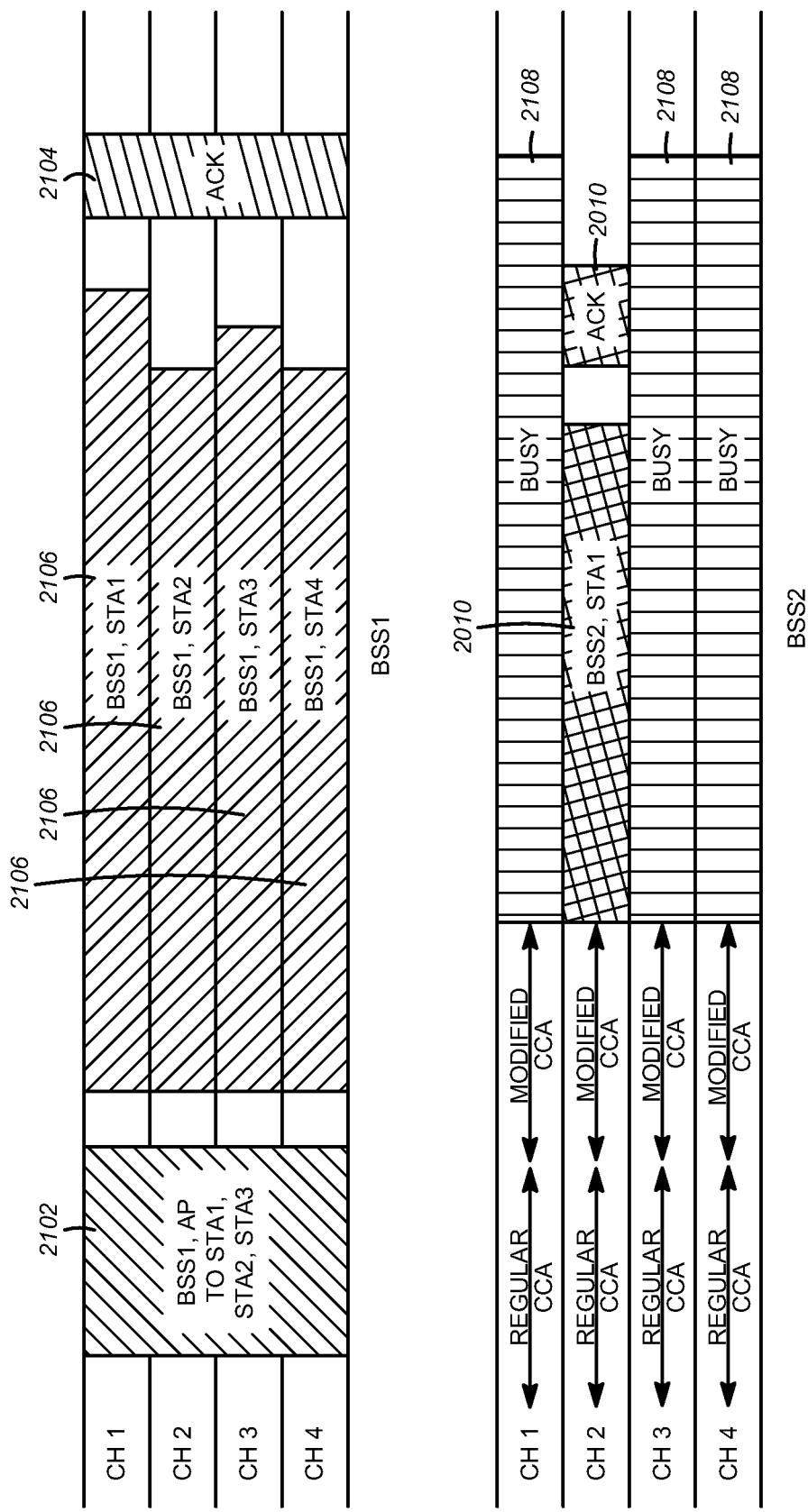
FIG. 21 is an example OBSS transmission with modified CCA that may be used with methods, devices, and/or systems described herein.

The systems, devices, and methods described may include transmission with one or more, or each, sub-channel allowed for spatial reuse (e.g., one or more, or all sub-channels). In the OBSS STA, one or more, or all sub-channels can be used for spatial reuse. The procedure may be used for UL-OFDMA transmission using an OFDMA-based CCA threshold mechanism. In the primary BSS, the AP may send an UL OFDMA schedule frame to the UL OFDMA STAs. The schedule frame may contain information on the STAs to be scheduled and/or their allocated sub-channels. The UL OFDMA STAs may transmit data to the AP. One or more, or each, transmitted frame may contain the UL OFDMA data for one or more, or each, STA. An OBSS STA may overhear the original transmission by the AP and/or the retransmission by the STA. The OBSS STA may initiate an OFDMA-based PHY_CCA.indication procedure as described above as indicated by BSS on a STA joining the BSS and/or when it determines an OFDMA transmission in its neighboring BSS is in progress (e.g., when it overhears an OFDMA schedule and/or trigger frame). The OBSS STA identifies sub-channels that are robust to OBSS transmission from the overheard transmissions. The OBSS STA may initiate the OFDMA-based PHY_CCA.indication procedure as discussed above. PHY_CCA.sub-channel_indication may be set to 0. The back-off procedure in OBSS may be started. If able to access the sub-channel after back-off then the transmission procedure for available sub-channel with PHY_CCA.sub-channel_indication=0 may be started. If PHY_CCA.sub-channel_indication is set to 1, then sub-channel is not used. The OBSS STA may transmit on the robust, available sub-channels. In the scenario where the sub-channel size is less than 20 MHz, the OBSS STA may limit its transmission to that sub-channel. In the scenario where the sub-channel size is less than 20 MHz, the OBSS STA may limit its transmission to that sub-channel. On successful reception of the transmitted data in the primary BSS, the STA may send an ACK to the AP. Note that the ACKs may be sent concurrently. The technique is illustrated in FIGS. 20-21.

In FIG. 20, the circle 2002 indicates the logical boundaries of BSS1, while the circles 2004, 2006, 2008, 2010 indicate the area around one or more, or each, STA that is affected by transmission from that STA based on its transmit power. In FIG. 20, it can be seen that the circles overlap at BS1 AP, which is to be expected as BS1 AP is the receiver of the uplink OFDMA transmission. As is also depicted, BS2 contains BS2, STA1 and BS2 AP. In FIG. 20, the circle 2012 indicates the range of the CCA threshold for BS2 STA1. As this intersects BS1 STA1, BS1 STA3 and BS1 STA4, the OBSS STA may be prevented from transmitting when measuring the CCA across the transmission bandwidth. In FIG. 21, the frames 2102, 2104 show the OFDMA schedule and/or acknowledgement frames sent by the AP in BSS1 while the frames 2106 show the data transmission frames from the STAs to the AP. Using the modified CCA, BSS2, STA1 may be able to identify sub-channels 1, 3 and/or 4 as busy at 2108 and/or transmit data in sub-channel at 2010.

The systems, devices, and/or methods described may include transmission with a subset of OFDMA sub-channels allowed for spatial reuse. A neighboring BSS may use OFDMA transmission and/or may send information to the OBSS STAs indicating that a sub-set of the sub-channels (e.g., only a subset of the sub-channels) may be scheduled with STAs that are robust to frequency reuse. The OFDMA-based CCA procedure may be performed on the subset of sub-channels (e.g., only a subset of the sub-channels) that are indicated. The following procedure may use any of the following in any logical order. BSSs may negotiate between themselves to designate certain sub-channels as available for frequency reuse during an OFDMA transmission. The negotiation may be such that neighboring BSSs may assign orthogonal sub-channels as available for frequency reuse. The OBSS STA, one or more, or all sub-channels may be used for spatial reuse. The following procedure may use any of the following in any logical order for UL-OFDMA transmission using an OFDMA-based CCA threshold mechanism. In the primary BSS, the AP may send an UL OFDMA schedule frame to the UL OFDMA STAs. The schedule frame may contain information on the STAs to be scheduled and/or their allocated sub-channels. The UL OFDMA STAs may transmit data to the AP. One or more, or each, transmitted frame may contain the UL OFDMA data for one or more, or each, STA.

In one or more techniques, the concept referred to as frequency reuse may be considered as substantially similar to the concept of spatial reuse (SR) as described herein.

An OBSS STA may overhear either the original transmission by the AP and/or the retransmission by the STA. The OBSS STA may initiate an OFDMA-based CCA procedure as discussed above at one or more, or all times as indicated by BSS on a STA joining the BSS and/or when it determines an OFDMA transmission in its neighboring BSS is in progress (e.g., when it overhears an OFDMA schedule and/or trigger frame). The OBSS STA may identify sub-channels that are robust to OBSS transmission from the overheard transmissions. The OBSS STA may limit the procedure to the sub-channels that the primary BSS has indicated as frequency reuse friendly. The OBSS STA may initiate the OFDMA-based PHY_CCA.indication procedure as discussed above. If PHY_CCA.sub-channel_indication is set to 0, for example, if the sub-channel is available, the back-off procedure in OBSS may be started. If able to access the sub-channel after back-off, then the transmission procedure for available sub-channel with PHY_CCA.sub-channel_indication=0 may be started. If PHY_CCA.sub-channel_indication is set to 1, then sub-channel might not be used. The OBSS STA may transmit on the robust, available sub-channels (e.g., only a subset of the sub-channels). In scenarios such as where the sub-channel size is less than 20 MHz, the OBSS STA may limit its transmission to that sub-channel. In the scenario where the sub-channel size is less than 20 MHz, the OBSS STA may limit its transmission to that sub-channel. On successful reception of the transmitted data in the primary BSS, one or more, or each, STA may send an ACK to the AP. The ACKs may be sent concurrently.

The systems, devices, and methods described may include changing CSMA/CA access priority for OBSS STAs. Information gathered as described above may be used to modify the CSMA/CA priority that OBSS STAs may use to access the medium. On identifying a sub-channel suitable for spatial reuse, they may modify their CSMA/CA access to have a higher priority on that sub-channel (e.g., only that sub-channel) and/or have a higher priority for transmission on the entire transmission channel and limit at least one transmission to that sub-channel/sub-band (e.g., only that sub-channel/sub-band).

For example, in scenarios including two RUs, an OBSS STA may adjust one or more CSMA/CA transmission parameters so that it transmits with a higher priority (e.g., probability) on RU1 (which may be SR capable and/or "friendly") than on RU2 (which might not be SR capable and/or "friendly").

The systems, devices, and/or methods described may include transmission using an OFDMA-based CCA procedure for a sleeping STA that wakes up. This procedure may be followed by both STAs in the primary BSS and/or in an OBSS. An STA that is in sleep mode may wake up during an OFDMA transmission. To decide on whether the medium is busy, the following procedure one or more of the following may be used in any logical order. The AP and/or STA may set a sleep mode Clear Channel Assessment (CCA) procedure that accounts for OFDMA transmissions. This may be set as the default mode and/or may be set with a flag by the network during association. This may be called the OFDMA sleep mode. An OFDMA based CCA procedure as described herein may be used to decide if the channel is busy. Rather than an exhaustive search of the sub-channels, if x of the sub-channels have PHY CCA.sub-channel indication=1, then the channel is busy. The value of x may be 1 and/or may be set to minimize the false alarm probability. The AP may allocate sub-channels in a geographical manner. An STA may be able to measure a specific sub-set of the sub-channels to decide if a channel is busy. The channels to measure may be signaled by the AP to the specific STA and/or may be discovered dynamically by one or more, or each, STA. In this case, an OFDMA based CCA procedure based on any of the methods discussed previously in the document but for specific sub-channels may be used to decide if the channel is busy and/or may be implemented for one or more, or each, specific STA. An uplink OFDMA transmission in which the STAs are located at North (channel 1), South (channel 3), East (channel 2) and/or West (channel 4) may be assumed. An STA located at the south west location may be asked to check channels' 3 and/or 4 on wake-up. On an OFDMA transmission, the AP may schedule STA West and/or STA East in channels 3 and/or 4 to enable the STA perform a proper CCA on wake-up. The STA that wakes up may be mandated to wait until it overhears a new transmission to start the channel access procedure. This may prevent the STA from interrupting an on-going OFDMA transmission.

The systems, devices, and/or methods described may include sub-channel measurements. The systems, devices, and/or methods described may include sub-channel load measurement. An STA may experience unbalanced transmissions on different sub-channels. For this STA, certain sub-channels may be more heavily utilized than the rest of sub-channels. The utilization here may refer to transmissions happening in its own BSS and/or OBSS. This may be due to the geometry of overlapping BSSs around this STA and/or the spatial reuse mode setting on sub-channels of OBSS APs. The AP may decide the access priorities on different sub-channels for one or more, or each, STA. The AP may use sub-channel load information from STAs. The sub-channel load may be defined as the percentage of time the STA sensed the medium is busy on one or more, or each, sub-channel. The existing channel load request/report pair which returns the channel utilization measurement as observed by the measuring STA may be modified and/or reused for sub-channel load request/report. The AP may send a sub-channel measurement request frame to a STA and/or a group of STAs. The AP may request the STA(s) to report the sub-channel measurements on one or more sub-channels. On receiving the request, the STA(s) may measure the sub-channels and/or send a sub-channel measurement report to the AP. In the case that the AP requests the measurement from one STA, the STA may send the measurement report to the AP xIFS time after the reception of the request frame.

For example, perhaps if the AP sends a measurement request to more than one STA, the STAs may use one or more of the following to transmit the measurement report to the AP. The STAs may transmit the measurement report on a poll-transmission manner. The AP may poll one STA, and/or the polled STA transmit the report. The first STA may transmit the report without polling. The STAs may transmit the measurement reports sequentially one after another. The frames may be separated by xIFS. The STAs may transmit the measurement reports, perhaps for example when they compete and/or acquire the media. The report might not follow the reception of the measurement request frame (for example, immediately), and/or it may be transmitted in a delayed mode. The STAs may transmit the measurement reports using simultaneous uplink transmission schemes, such as UL MU-MIMO, UL OFDMA. The AP may allow the STAs to report the sub-channel load measurement autonomously and/or triggered based. The AP may indicate the condition when the STAs may transmit the report. The STAs may transmit the sub-channel load report when it may observe an imbalanced sub-channel loading. The imbalanced sub-channel loading condition may be defined by comparing the ratio of the maximum sub-channel load and/or minimum sub-channel load on different sub-channels with a specified threshold. The measurement may be taken during a specified period, and/or a period longer than the specified period. An example format of the measurement request field for sub-channel load request may be defined in Table 3.

TABLE 3

Example Format of the Measurement Request Field for Sub-Channel Load Request

| Sub-channel Indication | Sub-Channel indices | Report Type | Report Condition | Measurement duration | Vendor specific | Reserved |
|---|---|---|---|---|---|---|

Sub-channel Indication may indicate whether the destination STA may report the sub-channel load on one or more, or all, of the sub-channels and/or a partial/subset of the sub-channels.

Sub-Channel indices may exist when the sub-channel indication indicates the report may be a measurement on a subset of the sub-channels (e.g., only when the sub-channels indicates the report may be a measurement on a subset of the sub-channels). The field may indicate the sub-channel indices which may be used for sub-channel load measurement.

The Report Type may be utilized to indicate different report types. For an Immediate Report, this value may indicate the report may be transmitted immediately after the reception of the request frame. For an Immediate MU report, this value may indicate the report may be transmitted (for example, immediately) after the reception of the request frame, and/or MU transmission may be used. The detailed MU transmission method, such as OFDMA, MU-MIMO, may be indicated by this field. The Triggered Report value may indicate that the report may be transmitted in a triggered mode. For example, the AP may transmit a poll frame to trigger the transmission of the report. For Delayed triggered report, this value may indicate that the report may be transmitted in a delayed way. The report may be polled and/or triggered by the AP before transmitting. For Delayed Triggered MU Report, this value may indicate the report may be transmitted in a delayed way and/or MU transmission may be used. The detailed MU transmission method, such as OFDMA, MU-MIMO, may be indicated by this field. For Delayed Autonomous Report, this value may indicate that the report may be transmitted in a delayed way. The report might not be polled and/or triggered by the AP before transmitting. The STA may determine to transmit the report on a certain condition.

The Report Condition may be utilized to indicate the condition when a STA may report the sub-channel load. Several report conditions may be specified. For example, one or more of the following may be specified: the ratio of the maximum sub-channel load and minimum sub-channel load is greater than a specified value, the maximum sub-channel load is greater than a specified value, the minimum sub-channel load is less than a specified value, the average sub-channel load is greater than a specified value, and/or the average sub-channel load is less than a specified value.

The Measurement Duration field may indicate a measurement duration threshold. The destination STA may perform measurement during this duration threshold, and/or longer than the duration threshold. This field may be defined the same way as a standard. The Vendor Specific field may be used by vendors. The Reserved field is reserved.

An example format of the measurement report field for sub-channel load report may be defined as in Table 4.

TABLE 4

Example Format of the Measurement Report Field for Sub-Channel Load Report

| Sub-channel Indices/Bitmap | Report Type | Report Condition | Actual Measurement Start Time | Measurement duration | Sub-Channel Loads | Reserved |
|---|---|---|---|---|---|---|

Sub-channel Indication may indicate the sub-channel indices where the report is for. The Report Type may be utilized to indicate different report types. The report type may be the same as that defined in a measurement request field.

The Report Condition may be utilized to indicate the condition the STA may designed to report the sub-channel load. The report condition may be the same as that defined in a measurement request field. The Actual Measurement Start Time may be defined the same way as a standard. The Measurement Duration field may be defined the same way as a standard.

The Sub-channel loads may be utilized to report sub-channel loads for one or more, or multiple sub-channels. This field may contain sub-channel ID, and/or may be followed by the corresponding sub-channel load. The above mentioned structure may be repeated for one or more, or all reported the sub-channels. The field may contain sub-channel loads and/or the order (for example mapping of sub-channel load to sub-channel index) may be pre-specified. The vendor specific field may be used by vendors. The Reserved field may be reserved.

Figure 22A:
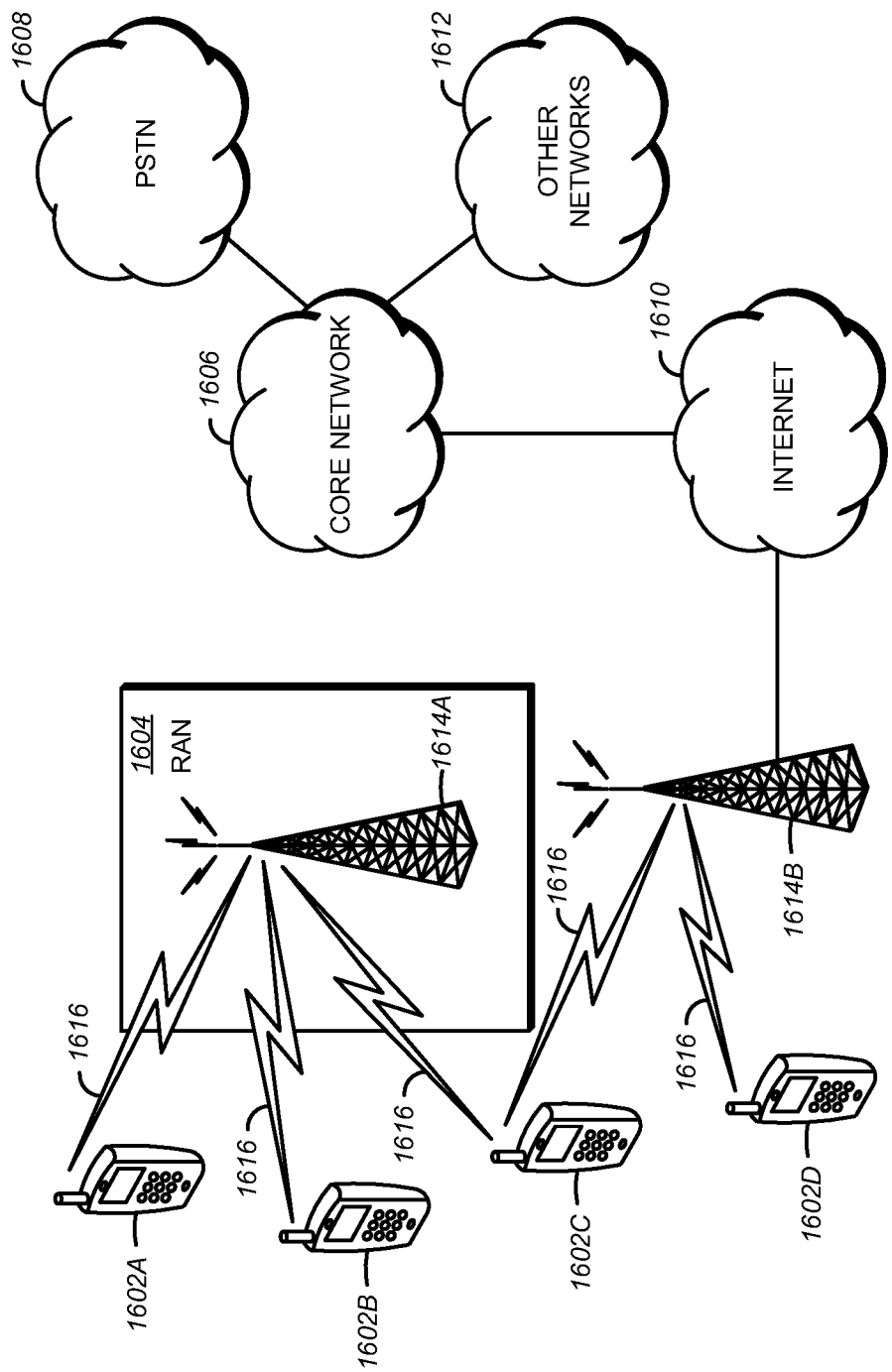
FIG. 22A is a system diagram of an example communications system in which one or more disclosed embodiments may be implemented.

FIG. 22A is a diagram of an example communications system 1600 in which one or more disclosed embodiments may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 1600 may be a multiple access system that provides content, such as voice, data, video, messaging, broadcast, etc., to one or more, or multiple wireless users. The communications system 1600 may enable one or more, or multiple wireless users to access such content through the sharing of system resources, including wireless bandwidth. For example, the communications systems 1600 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 22A, the communications system 1600 may include at least one wireless transmit/receive unit (WTRU), such as a plurality of WTRUs, for instance WTRUs 1602a, 1602b, 1602c, and/or 1602d, a radio access network (RAN) 1604, a core network 1606, a public switched telephone network (PSTN) 1608, the Internet 1610, and other networks 1612, though it should be appreciated that the disclosed embodiments contemplate any number of WTRUs, base stations, networks, and/or network elements. Each of the WTRUs 1602a, 1602b, 1602c, 1602d may be any type of device configured to operate and/or communicate in a wireless environment. By way of example, the WTRUs 1602a, 1602b, 1602c, 1602d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1600 may also include a base station 1614a and a base station 1614b. Each of the base stations 1614a, 1614b may be any type of device configured to wirelessly interface with at least one of the WTRUs 1602a, 1602b, 1602c, 1602d to facilitate access to one or more communication networks, such as the core network 1606, the Internet 1610, and/or the networks 1612. By way of example, the base stations 1614a, 1614b may be a base transceiver station (BTS), a Node-B, an eNode B, a Home Node B, a Home eNode B, a site controller, an access point (AP), a wireless router, and the like. While the base stations 1614a, 1614b are each depicted as a single element, it should be appreciated that the base stations 1614a, 1614b may include any number of interconnected base stations and/or network elements.

The base station 1614a may be part of the RAN 1604, which may also include other base stations and/or network elements (not shown), such as a base station controller (BSC), a radio network controller (RNC), relay nodes, etc. The base station 1614a and/or the base station 1614b may be configured to transmit and/or receive wireless signals within a particular geographic region, which may be referred to as a cell (not shown). The cell may further be divided into cell sectors. For example, the cell associated with the base station 1614a may be divided into three sectors. Thus, in one embodiment, the base station 1614a may include three transceivers, e.g., one for each sector of the cell. In another embodiment, the base station 1614a may employ multiple-input multiple output (MIMO) technology and, therefore, may utilize one or more, or multiple transceivers for each sector of the cell.

The base stations 1614a, 1614b may communicate with one or more of the WTRUs 1602a, 1602b, 1602c, 1602d over an air interface 1616, which may be any suitable wireless communication link (e.g., radio frequency (RF), microwave, infrared (IR), ultraviolet (UV), visible light, etc.). The air interface 1616 may be established using any suitable radio access technology (RAT).

More specifically, as described above, the communications system 1600 may be a multiple access system and may employ one or more channel access schemes, such as CDMA, TDMA, FDMA, OFDMA, SC-FDMA, and the like. For example, the base station 1614a in the RAN 1604 and the WTRUs 1602a, 1602b, 1602c may implement a radio technology such as Universal Mobile Telecommunications System (UMTS) Terrestrial Radio Access (UTRA), which may establish the air interface 1616 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 1614a and the WTRUs 1602a, 1602b, 1602c may implement a radio technology such as Evolved UMTS Terrestrial Radio Access (E-UTRA), which may establish the air interface 1616 using Long Term Evolution (LTE) and/or LTE-Advanced (LTE-A).

The base station 1614a and the WTRUs 1602a, 1602b, 1602c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1614b in FIG. 22A may comprise a wireless router, Home Node B, Home eNode B, and/or access point, for example, and may utilize any suitable RAT for facilitating wireless connectivity in a localized area, such as a place of business, a home, a vehicle, a campus, and the like. In one embodiment, the base station 1614b and the WTRUs 1602c, 1602d may implement a radio technology such as IEEE 802.11 to establish a wireless local area network (WLAN). In another embodiment, the base station 1614b and the WTRUs 1602c, 1602d may implement a radio technology such as IEEE 802.15 to establish a wireless personal area network (WPAN). In yet another embodiment, the base station 1614b and the WTRUs 1602c, 1602d may utilize a cellular-based RAT (e.g., WCDMA, CDMA2000, GSM, LTE, LTE-A, etc.) to establish a picocell and/or femtocell. As shown in FIG. 22A, the base station 1614b may have a direct connection to the Internet 1610. Thus, the base station 1614b might not be required to access the Internet 1610 via the core network 1606.

The RAN 1604 may be in communication with the core network 1606, which may be any type of network configured to provide voice, data, applications, and/or voice over internet protocol (VoIP) services to one or more of the WTRUs 1602a, 1602b, 1602c, 1602d. For example, the core network 1606 may provide call control, billing services, mobile location-based services, pre-paid calling, Internet connectivity, video distribution, etc., and/or perform high-level security functions, such as user authentication. Although not shown in FIG. 22A, it should be appreciated that the RAN 1604 and/or the core network 1606 may be in direct or indirect communication with other RANs that employ the same RAT as the RAN 1604 and/or a different RAT. For example, in addition to being connected to the RAN 1604, which may be utilizing an E-UTRA radio technology, the core network 1606 may also be in communication with another RAN (not shown) employing a GSM radio technology.

The core network 1606 may also serve as a gateway for the WTRUs 1602a, 1602b, 1602c, 1602d to access the PSTN 1608, the Internet 1610, and/or other networks 1612. The PSTN 1608 may include circuit-switched telephone networks that provide plain old telephone service (POTS). The Internet 1610 may include a global system of interconnected computer networks and devices that use common communication protocols, such as the transmission control protocol (TCP), user datagram protocol (UDP) and the internet protocol (IP) in the TCP/IP internet protocol suite. The networks 1612 may include wired and/or wireless communications networks owned and/or operated by other service providers. For example, the networks 1612 may include another core network connected to one or more RANs, which may employ the same RAT as the RAN 1604 and/or a different RAT.

Some or all of the WTRUs 1602a, 1602b, 1602c, 1602d in the communications system 1600 may include multi-mode capabilities, e.g., the WTRUs 1602a, 1602b, 1602c, 1602d may include one or more, or multiple transceivers for communicating with different wireless networks over different wireless links. For example, the WTRU 1602c shown in FIG. 22A may be configured to communicate with the base station 1614a, which may employ a cellular-based radio technology, and with the base station 1614b, which may employ an IEEE 802 radio technology.

Figure 22B:
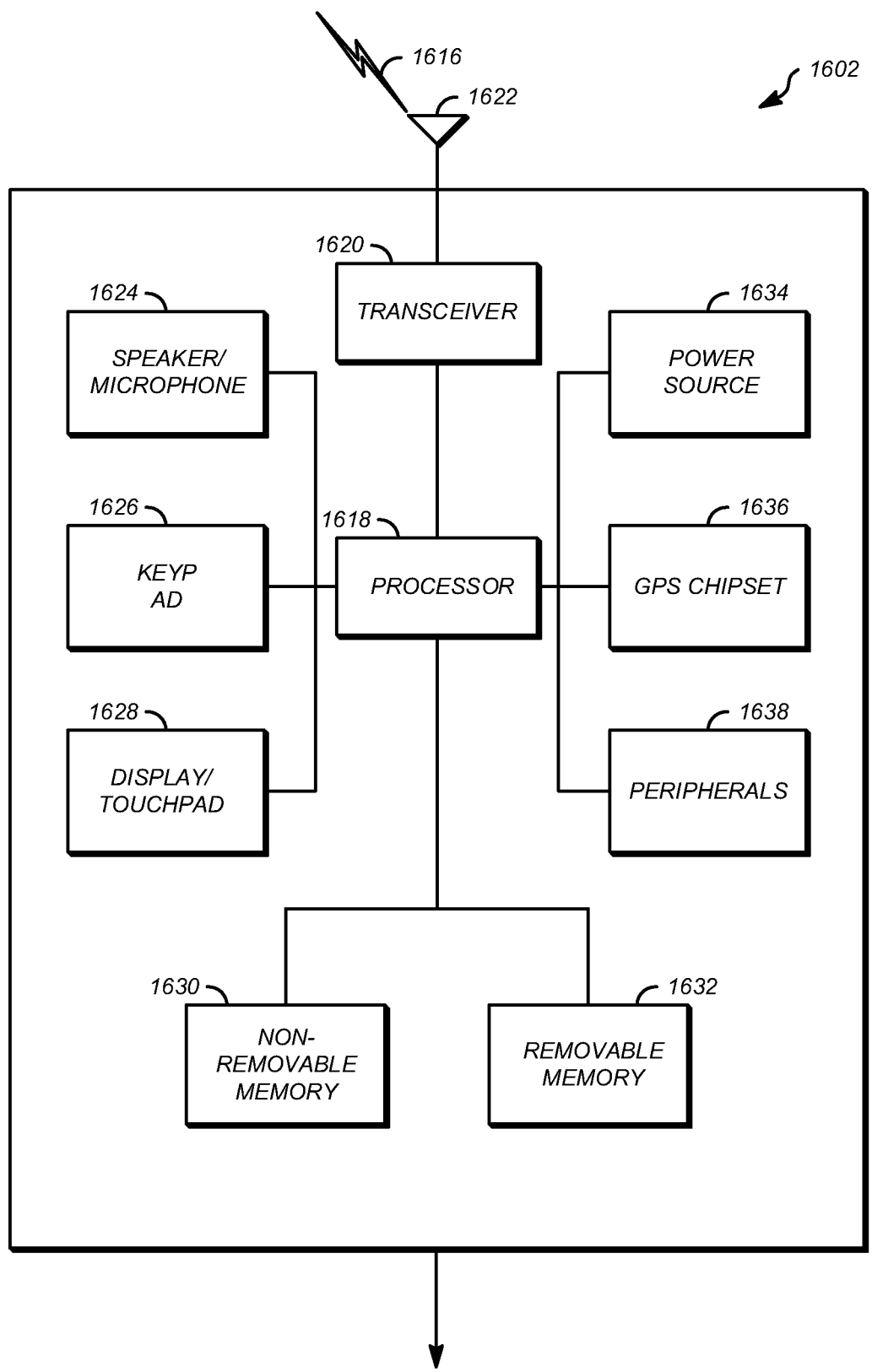
FIG. 22B is a system diagram of an example wireless transmit/receive unit (WTRU) that may be used within the communications systems described herein.

FIG. 22B is a system diagram of an example WTRU 1602. A WTRU may be a user equipment (UE), a mobile station, a WLAN STA, a fixed or mobile subscriber unit, a pager, a cellular telephone, a personal digital assistant (PDA), a smartphone, a laptop, a netbook, a personal computer, a wireless sensor, consumer electronics, and the like. WTRU 1602 may be used in one or more of the communications systems described herein. As shown in FIG. 22B, the WTRU 1602 may include a processor 1618, a transceiver 1620, a transmit/receive element 1622, a speaker/microphone 1624, a keypad 1626, a display/touchpad 1628, non-removable memory 1630, removable memory 1632, a power source 1634, a global positioning system (GPS) chipset 1636, and other peripherals 1638. It should be appreciated that the WTRU 1602 may include any sub-combination of the foregoing elements while remaining consistent with an embodiment.

The processor 1618 may comprise a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1618 may perform signal coding, data processing, power control, input/output processing, and/or any other functionality that enables the WTRU 1602 to operate in a wireless environment. The processor 1618 may be coupled to the transceiver 1620, which may be coupled to the transmit/receive element 1622. While FIG. 22B depicts the processor 1618 and the transceiver 1620 as separate components, it should be appreciated that the processor 1618 and the transceiver 1620 may be integrated together in an electronic package and/or chip.

The transmit/receive element 1622 may be configured to transmit signals to, and/or receive signals from, a base station (e.g., the base station 1614a) over the air interface 1616. For example, in one embodiment, the transmit/receive element 1622 may be an antenna configured to transmit and/or receive RF signals. In another embodiment, the transmit/receive element 1622 may be an emitter/detector configured to transmit and/or receive IR, UV, and/or visible light signals, for example. In yet another embodiment, the transmit/receive element 1622 may be configured to transmit and receive both RF and light signals. It should be appreciated that the transmit/receive element 1622 may be configured to transmit and/or receive any combination of wireless signals.

In addition, although the transmit/receive element 1622 is depicted in FIG. 22B as a single element, the WTRU 1602 may include any number of transmit/receive elements 1622. More specifically, the WTRU 1602 may employ MIMO technology. Thus, in one embodiment, the WTRU 1602 may include two or more transmit/receive elements 1622 (e.g., one or more, or multiple antennas) for transmitting and receiving wireless signals over the air interface 1616.

The transceiver 1620 may be configured to modulate the signals that are to be transmitted by the transmit/receive element 1622 and to demodulate the signals that are received by the transmit/receive element 1622. As described above, the WTRU 1602 may have multi-mode capabilities. Thus, the transceiver 1620 may include one or more, or multiple transceivers for enabling the WTRU 1602 to communicate via one or more, or multiple RATs, such as UTRA and IEEE 802.11, for example.

The processor 1618 of the WTRU 1602 may be coupled to, and may receive user input data from, the speaker/microphone 1624, the keypad 1626, and/or the display/touchpad 1628 (e.g., a liquid crystal display (LCD) display unit and/or organic light-emitting diode (OLED) display unit). The processor 1618 may also output user data to the speaker/microphone 1624, the keypad 1626, and/or the display/touchpad 1628. In addition, the processor 1618 may access information from, and store data in, any type of suitable memory, such as the non-removable memory 1630 and/or the removable memory 1632. The non-removable memory 1630 may include random-access memory (RAM), read-only memory (ROM), a hard disk, and/or any other type of memory storage device. The removable memory 1632 may include a subscriber identity module (SIM) card, a memory stick, a secure digital (SD) memory card, and the like. In other embodiments, the processor 1618 may access information from, and store data in, memory that is not physically located on the WTRU 1602, such as on a server and/or a home computer (not shown).

The processor 1618 may receive power from the power source 1634, and may be configured to distribute and/or control the power to the other components in the WTRU 1602. The power source 1634 may be any suitable device for powering the WTRU 1602. For example, the power source 1634 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1618 may also be coupled to the GPS chipset 1636, which may be configured to provide location information (e.g., longitude and latitude) regarding the current location of the WTRU 1602. In addition to, and/or in lieu of, the information from the GPS chipset 1636, the WTRU 1602 may receive location information over the air interface 1616 from a base station (e.g., base stations 1614a, 1614b) and/or determine its location based on the timing of the signals being received from two or more nearby base stations. It should be appreciated that the WTRU 1602 may acquire location information by way of any suitable location-determination method while remaining consistent with one or more of the described devices, systems, and/or techniques.

The processor 1618 may further be coupled to other peripherals 1638, which may include one or more software and/or hardware modules that provide additional features, functionality and/or wired or wireless connectivity. For example, the peripherals 1638 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that one or more, or each, feature and/or element may be used alone or in any combination with the other features and elements. Other than the 802.11 protocols described herein, the features and elements described herein may be applicable to other wireless systems. Although the features and elements described herein may have been described for uplink operation, the methods and procedures may be applied to downlink operation. Although SIFS may have been used herein to indicate various inter frame spacing, other inter frame spacing, e.g., RIFS or other agreed time interval may be applied. In addition, the methods described herein may be implemented in a computer program, software, and/or firmware incorporated in a computer-readable medium for execution by a computer and/or processor. Examples of computer-readable media include electronic signals (transmitted over wired and/or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, UE, terminal, base station, RNC, and/or any host computer.

What is claimed is:

1. A method performed by a station (STA), the method comprising:
    receiving, from a neighboring STA in an overlapping basic service set (OBSS), a physical (PHY) layer preamble that includes a signal field indicating a plurality of sub-bands and associated power thresholds for Uplink Orthogonal Frequency-Divisional Multiple Access (UL OFDMA) transmission, that are available for OBSS spatial reuse (SR) by the STA; and
    sending, to an AP with which the STA is associated, an UL OFDMA transmission using a sub-band of the plurality of sub-bands and an associated power threshold indicated in the signal field.

2. The method of claim 1, wherein the signal field is a high efficiency (HE) SIG-A field.

3. The method of claim 1, wherein the PHY layer preamble is included in a PHY layer convergence procedure (PLCP) protocol data unit (PPDU) received from the neighboring STA.

4. The method of claim 1, wherein the plurality of sub-bands comprise 20 MHz or 40 MHz sub-bands.

5. The method of claim 1, wherein the received signal field is a retransmission of OBSS SR information from an OBSS AP to which the neighboring STA is associated.

6. The method of claim 1, wherein the associated power thresholds comprise maximum transmit powers for OBSS SR.

7. The method of claim 1, wherein prior to sending the UL OFDMA transmission, the method further comprises:
    initiating an OFDMA-based PHY clear channel assessment (CCA) procedure on the sub-band to determine whether the sub-band is busy.

8. A station (STA) comprising:
    a processor and a transceiver in communication with the processor, the processor and transceiver configured to:
    receive, from a neighboring STA in an overlapping basic service set (OBSS), a physical (PHY) layer preamble that includes a signal field indicating a plurality of sub-bands and associated power thresholds for Uplink Orthogonal Frequency-Divisional Multiple Access (UL OFDMA) transmission, that are available for OBSS spatial reuse (SR) by the STA; and
    send, to an AP with which the STA is associated, an UL OFDMA transmission using a sub-band of the plurality of sub-bands and an associated power threshold indicated in the signal field.

9. The STA of claim 8, wherein the signal field is a high efficiency (HE) SIGA field.

10. The STA of claim 8, wherein the PHY layer preamble is included in a PHY layer convergence procedure (PLCP) protocol data unit (PPDU) received from the neighboring STA.

11. The STA of claim 8, wherein the plurality of sub-bands comprise at least 20 MHz or 40 MHz sub-bands.

12. The STA of claim 8, wherein the received signal field is a retransmission of OBSS SR information from an OBSS AP to which the neighboring STA is associated.

13. The STA of claim 8, wherein the associated power thresholds comprise maximum transmit powers for OBSS SR.

14. The STA of claim 8, wherein prior to sending the UL OFDMA transmission, the method further comprises:
    initiating an OFDMA-based PHY clear channel assessment (CCA) procedure on the sub-band to determine whether the sub-band is busy.

* * * * *